United States Patent
Lo et al.

(10) Patent No.: US 9,747,494 B2
(45) Date of Patent: Aug. 29, 2017

(54) FACIAL MATCHING SYSTEM

(71) Applicant: MorphoTrak, LLC, Anaheim, CA (US)

(72) Inventors: Peter Zhen-Ping Lo, Mission Viejo, CA (US); Hui Chen, Foothill Ranch, CA (US)

(73) Assignee: MorphoTrak, LLC, Anaheim, CA (US)

( * ) Notice: Subject to any disclaimer, the term of this patent is extended or adjusted under 35 U.S.C. 154(b) by 142 days.

(21) Appl. No.: 14/942,118

(22) Filed: Nov. 16, 2015

(65) Prior Publication Data
US 2017/0140212 A1 May 18, 2017

(51) Int. Cl.
*G06K 9/00* (2006.01)
*G06K 9/62* (2006.01)

(52) U.S. Cl.
CPC ....... *G06K 9/00288* (2013.01); *G06K 9/6202* (2013.01); *G06K 9/6215* (2013.01)

(58) Field of Classification Search
CPC ............. G06K 9/00288; G06K 9/6215; G06K 9/6202; G06K 9/00268; G06K 9/00295; G06K 9/46; G06K 9/00281
USPC .......................................................... 382/118
See application file for complete search history.

(56) References Cited

U.S. PATENT DOCUMENTS

| | | | |
|---|---|---|---|
| 5,432,864 A * | 7/1995 | Lu | G06K 9/00275 340/5.83 |
| 5,933,527 A * | 8/1999 | Ishikawa | G06K 9/00268 382/118 |
| 7,039,221 B1 * | 5/2006 | Tumey | G06K 9/00221 382/118 |
| 7,054,468 B2 | 5/2006 | Yang | |
| 7,142,697 B2 | 11/2006 | Huang et al. | |
| 7,146,050 B2 | 12/2006 | Lienhart et al. | |
| 7,436,988 B2 * | 10/2008 | Zhang | G06K 9/00268 382/118 |
| 7,630,526 B2 | 12/2009 | Bober et al. | |
| 8,085,991 B2 | 12/2011 | Michaeli | |
| 8,861,800 B2 * | 10/2014 | Savvides | G06K 9/00201 351/204 |
| 8,885,893 B1 | 11/2014 | Estabridis | |
| 2011/0135166 A1 * | 6/2011 | Wechsler | G06K 9/00288 382/118 |

(Continued)

FOREIGN PATENT DOCUMENTS

CN 101976360 2/2013

OTHER PUBLICATIONS

Chellappa et al, "Human and Machine Recognition of Faces: A Survey," Proceedings of the IEEE, 1995, 83(5):705-740.

(Continued)

*Primary Examiner* — Kanjibhai Patel
(74) *Attorney, Agent, or Firm* — Fish & Richardson P.C.

(57) ABSTRACT

In some implementations, a computer-implemented method for recognizing facial images may include a multi-stage facial verification process to improve the speed and accuracy of a facial recognition operation. For example, a facial recognition module may include multiple stages where a subset of data is analyzed recursively to improve the speed of the facial recognition processes. The multiple stages may be arranged in a fast-to-slow and coarse-to-fine arrangements such that a match decision may be made at each successive stage.

20 Claims, 12 Drawing Sheets

(56) References Cited

U.S. PATENT DOCUMENTS

2014/0309865 A1* 10/2014 Ricci .................... H04W 48/04
701/36

OTHER PUBLICATIONS

Marques et al, "Effects of Eye Position on Eigenface-Based Face Recognition Scoring," Technical Report, MITRE Corporation, 2000.
Martinez, "Recognizing Imprecisley Localized, Partially Occluded, and Expression Variant Faces from a Single Sample per Class," IEEE Transactions on Pattern Analysis and Machine Intelligence, 2002, 24(6):748-763.
Min et al, "Eye Perturbation Approach for Robust Recognition of Inaccurately Aligned Faces," AVBPA 2005, LNCS 3546, 2005, pp. 41-50.
Riopka et al, "The eyes have it," Proceeding of the ACMSIGMM workshop on biometric methods and applications, 2003, pp. 9-16.
Shan et al, "Curse of Mis-Alignment in Face Recognition: Problem and a Novel Mis-Alignment Learning Solution," Proceesings of the 6th IEEE International Conference on Automatic Face and Gesture Recognition, 2004, pp. 314-320.
Wang et al, "Improving Face Recognition by Online Image Alignment," Proceedings of the 18th International Conference on Pattern Recognition, 2006, pp. 311-314.
Zhao et al, "Face recognition: A Literature Survey," ACM Computing Survey, 2003, 25(4):399-458.

* cited by examiner

ONE-TO-ONE OPERATION

ONE-TO-MANY OPERATION

OFFLINE ENROLLMENT
FOR 1:1 VERIFICATION OPERATION

MULTI-STAGE ONE-TO-ONE VERIFICATION OPERATION

1:1 PERTURBATION OPERATION

MULTI-STAGE ONE-TO-MANY IDENTIFICATION OPERATION

ONE-TO-MANY PERTURBATION OPERATION

FACIAL MATCHING SYSTEM

FIELD

The present specification relates generally to facial matching systems.

BACKGROUND

Automatic biometric identification systems are commonly used in many contexts to efficiently identify and verify the identity of individuals. For instance, automatic biometric identification systems often make such identification or verification based on facial characteristics of individuals. In such systems, facial characteristics are extracted from a facial image and compared to a set of previously collected reference images.

SUMMARY

Facial recognition systems often compare facial characteristics of an input image to be analyzed and facial characteristics of previously obtained images to determine the identity, or verify the identity, of an individual whose face is included in the image to be analyzed. For instance, facial recognition systems compute a match score between the input image and the previously obtained images and compare the match score to a threshold value in order to determine a match. However, such facial recognition systems also have difficulty producing sufficiently accurate results in resource-constrained applications. In addition, given the complexity of the data to be analyzing, many facial recognition systems often operate slowly, making their use inapplicable with a large number of previously obtained images.

Accordingly, one innovative aspect described throughout this specification includes the use of multi-stage facial matching techniques to improve the speed and accuracy of facial recognition processes. For instance, a facial recognition module may include multiple stages where a subset of data is analyzed recursively to improve the speed of the facial recognition processes. The multiple stages may be arranged in a fast-to-slow and coarse-to-fine arrangements such that a match decision may be made at each successive stage. For example, the match decision may be based on multiple thresholds that are designated to separate matching and non-matching candidates from the previously obtained images. In some instances, multiple facial matchers may additionally be arranged to use multi-pass facial match techniques utilizing the same fast-to-slow and coarse-to-fine arrangement.

Implementations may include one or more of the following features. For example, a computer-implemented method for recognizing facial images, the method implemented by a facial verification system having a processor and a memory coupled to the processor, the method including: obtaining (i) a verification facial image including a plurality of registration points, and (ii) a query identifier associated with the verification facial image; extracting a verification template based on the plurality of registration points; retrieving, based at least on the obtained query identifier and from a gallery dataset, (i) an enrolled target template, (ii) a reference template, and (iii) a first reference score between the target template and the reference template; computing a first similarity score between the verification template and the enrolled target template.

The computer-implemented method for verifying a facial image may include: comparing the value of the first similarity score to a first threshold value; computing, based at least on comparing the value of the first score to the first threshold value, (i) a second reference score between the verification template and the reference template, and (ii) a second threshold value, where the value of the second threshold value is based at least on the value of the first reference score and the value of the second reference score; comparing the value of the first similarity score and the second threshold value.

The computer-implemented method for verifying a facial image may include: generating, based at least on comparing the value of the first similarity score and the second threshold value, a plurality of perturbed verification templates for the verification template based at least on a plurality of perturbation points within the verification facial image; computing a second similarity score between the enrolled target template and the plurality of perturbed verification templates;

The computer-implemented method for verifying a facial image may include: comparing the value of the second similarity score to a third threshold value; and providing, for output to the facial verification system, based at least on comparing the value of the second similarity score to a threshold value, (i) data indicating a match for the verification facial image, and (ii) a final score associated with the verification facial image.

In some implementations, a computer-implemented method for recognizing facial images, the method implemented by a facial identification system having a processor and a memory coupled to the processor, the method including: obtaining, by a first facial matcher, (i) a query facial image including a plurality of registration points, (ii) a plurality of gallery templates from a gallery dataset, and (iii) a plurality of identifiers associated with the gallery templates; extracting, by the first facial matcher, a query template based at least on the plurality of registration points.

The computer-implemented method for recognizing facial images may include: comparing, by the first facial matcher, the query template to each of the plurality of gallery templates; computing, by the first facial matcher, for each of the plurality of gallery templates, a first similarity score between the query template and each of the plurality of gallery templates; selecting, by the first facial matcher, a subset of the plurality of gallery templates based at least on the respective values of the first similarity scores for each of the plurality of gallery templates.

The computer-implemented method of recognizing facial images may include: generating, by the first facial matcher, a sorted list that (i) includes the subset of the plurality of gallery templates, and the respective values of the first similarity scores, (ii) is sorted based at least on the respective values of the first similarity scores, and (iii) includes a value difference between adjacent respective values of the first similarity scores within the sorted list; comparing, by the first facial matcher, (i) the respective values of the first similarity scores to a first threshold value, and (ii) each of the value differences to a second threshold value.

The computer-implemented method of recognizing facial images may include: in response to determining that (i) at least one of the respective values of the first similarity scores is greater than the first threshold value, and (ii) at least one of the value differences is less than the second threshold, performing operations including: generating a plurality of perturbed query templates for the query template; and computing, for each gallery template within the subset of the plurality of gallery templates, a respective second similarity score between each of the subset of the plurality of gallery templates and each of the plurality of perturbed query templates.

The computer-implemented method for recognizing facial images may include: comparing, by the first facial matcher, the respective values of the second similarity scores to a third threshold value; in response to determining that each of the respective values of the second similarity scores are less than the third threshold value, providing, by the first matcher to a second facial matcher, a set of scores that includes the respective first similarity scores and the respective second similarity scores, for use in a subsequent fingerprint identification operation.

Other versions include corresponding systems, and computer programs, configured to perform the actions of the methods encoded on computer storage devices.

One or more implementations may include the following optional features. For example, in some implementations, generating the plurality of perturbed verification templates for the verification template includes: obtaining a plurality of normalized verification facial images based at least on the plurality of registration points within the verification facial image; and extracting a plurality of perturbed verification templates from the normalized verification facial image.

In some implementations, obtaining a plurality of normalized verification facial images includes: identifying a plurality of perturbation points within the verification facial image based at least on the plurality of registration points within the verification facial image; performing a perturbation procedure to a particular perturbation point of the plurality of perturbation points within the verification facial image; and extracting a plurality verification templates based at least on performing the perturbation procedure.

In some implementations, performing the perturbation procedure to the particular perturbation point of the plurality of perturbation points within the verification facial image includes: determining a range of perturbation points associated with the perturbation procedure; and determining, during an offline design stage prior to performing the perturbation procedure, a step size for the applying the perturbation procedure to the positions of the plurality of perturbation points within the verification facial image.

In some implementations, performing the perturbation procedure to the particular registration point of the plurality of registration points within the verification facial image includes: comparing a variation difference between the positions of a plurality of detected registration points and a set of ground truth registration locations for facial images with a different quality group; and computing (i) a standard deviation of localization errors, and (ii) a mean of localization errors, that are each associated with the positions of the plurality of detected registration points based at least on comparing a variation difference between the positions of the plurality of detected registration points and the set of ground truth registration locations for facial images with a different quality group.

In some implementations, determining the range of perturbation associated with the perturbation procedure includes: identifying a maximum perturbation range based at least on the standard deviation of the localization errors and the mean of localization errors.

In some implementations, the computer-implemented method of verifying facial images includes: obtaining (i) an enrolled target image associated with an enrolled target identifier, and (ii) a plurality of pre-collected non-matching reference facial images; generating an enrolled target template for the enrolled target image; generating, for each of the plurality of pre-collected non-matching reference facial images, a reference template; comparing the enrolled target template with each of the plurality of reference templates for the plurality of pre-collected non-matching reference facial images; generating a non-matching score between the enrolled target template and each of the plurality of reference templates for the plurality of pre-collected non-matching reference facial images; identifying a particular reference template that has the highest value of the non-matching scores as the first reference score; and storing the particular reference template within a gallery template record.

In some implementations of the facial identification method, the second facial matcher is configured to perform a higher precision facial identification operation, relative to the first facial matcher, using the set of first similarity and perturbed similarity scores.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

[Overview Paragraph]

Figure 1:
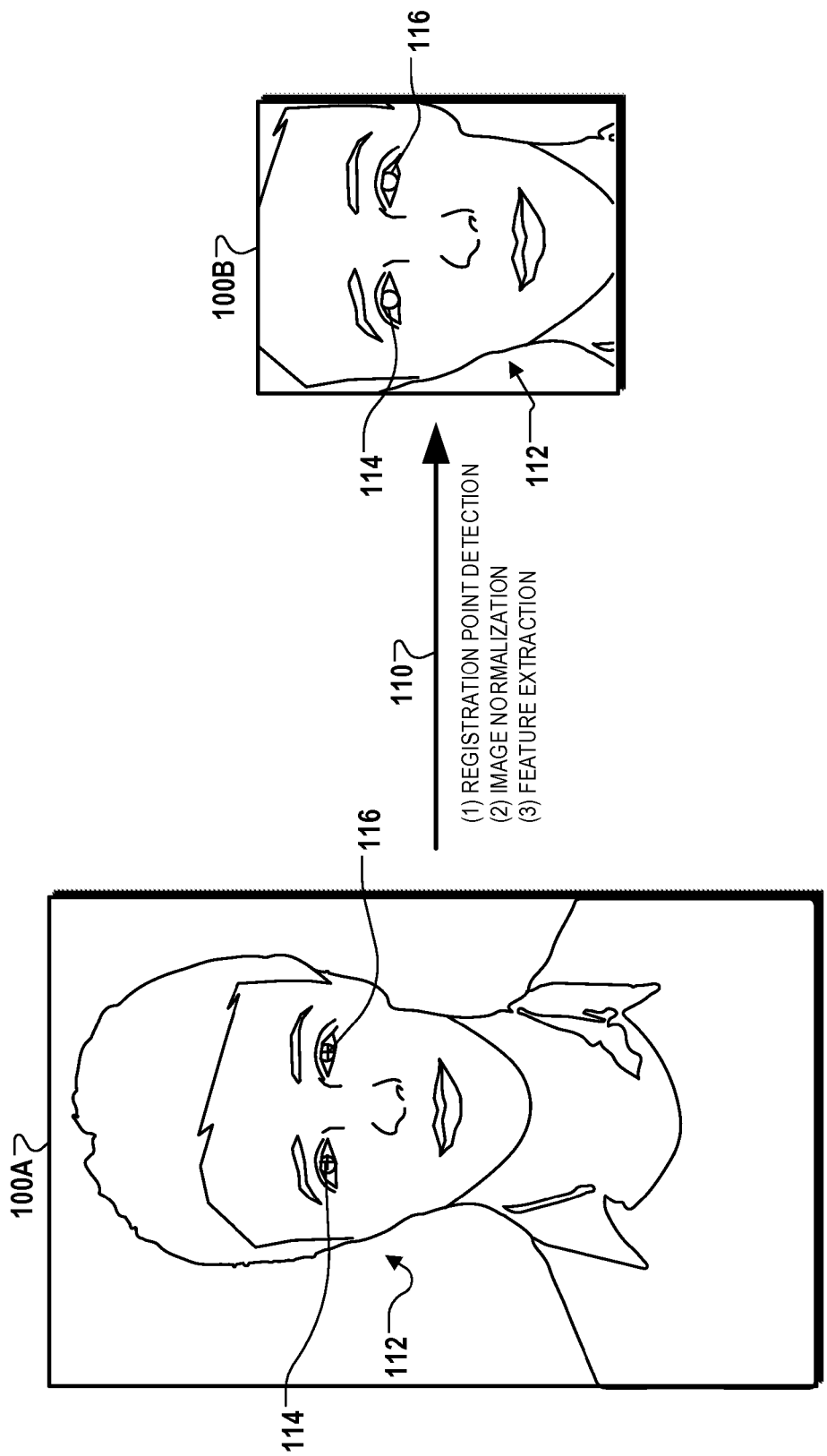
FIG. 1 illustrates exemplary pre-processed and processed facial images that may be used with facial verification and identification systems.

The following detailed description of the implementations of the disclosure refers to the accompanying drawings. The same reference numbers in different drawings may identify the same or similar elements. Also, the following detailed description does not limit the claims.

Matching System Overview

The systems and methods described provide a facial recognition system that utilizes multiple-stage matching architecture to improve the speed and accuracy of facial recognition, identification, and verification. In the methods described, matchers are arranged in a fast-to-slow and coarse-to-accurate fashion. A subset of data from the first stage is fed to the second stage which includes more precise matching. Matchers included in the second stage are determined using at least some eye-perturbation matching. A decision is made at each stage based on multiple thresholds to separate matching and non-matching candidates. The scores are scaled or promoted after the decision and the final results are fused based on the matching scores.

The facial recognition system described focuses on three primary features. First, the facial recognition system improves the matching accuracy of such systems by alleviating the inconsistency of the eye detection using eye perturbation. Second, a multiple-stage matching scheme is used to improve the speed and accuracy of facial matching. Third, thresholds and fusion are utilized to improve the accuracy of facial matching.

Initially, for each facial image analyzed, the image is enhanced to detect registration points with greater accuracy. Based on the registration points, the image is normalized by applying the geometric transformation to reduce the variations while keeping the registration points in a primary location of the normalized image. The feature template is then extracted from the normalized image.

Further, in some implementations, using the facial recognition system, the registration points are the center locations of the left and right eyes. In alternative implementations, the registration points are not limited to those points. For example, registration points could be other facial landmark points including, for example, nose tips and mouth centers.

As described throughout this specification, "gallery" and related terms refer to the facial images with known identities stored in the database to be compared against in a verification or identification system. In addition, "query" and related terms refer to the input images whose identities are to be verified or identified by comparing them with the target or gallery images in the database. Further, "reference" and related terms refer to the facial images constructed empirically to facilitate a match decision between a query and a target image. It is the generic facial images not mated in either the query or gallery image sets.

As described throughout this specification, "alignment" and "registration" and related terms refer to the process to extract common registration points from incoming facial images and align the images based on the registration points so that all the images are considered in relation to each other for further comparison. The positioning of facial images may include rotation, translation and scaling of the image using the registration points.

As described throughout this specification, "recognition systems" refer to systems that may be used for identification and verification applications. As used herein, such recognition systems include facial recognition systems that may be used to identify and verify individuals using the systems described. In addition, "identification" refers to a process wherein a biometric device captures an image and compares that image against every record or template in a pre-enrolled database. This type of comparison is called identification or a "one-to-many" (1:N) search.

As used and described throughout this specification, "verification" refers to a process of verifying a user that claims to have a particular identity. In one example, the biometric system requires input from the user, at which time the user claims his identity via a password, token, or user name (or any combination of these three). The system retrieves the pre-enrolled template of the person from a database or a card based on the input and compares a biometric sample captured from the user to the pre-enrolled template to verify whether the two templates are from same person or not. This process is called verification or a "one-to-one" (1:1) match. In addition, accuracy of such facial recognition systems may be determined based on true accept rates (TARs), false accept rates (FARs), and receiver operator characteristic (ROC) curves determined based on FAR and TAR values.

FIG. 1 illustrates exemplary pre-processed and processed facial images that may be used in identification and verification applications. As shown, a pre-processed facial image 100A may be provided as input to a facial recognition process 110 to generate a processed image 100B. The pre-processed facial image 100A may be an exemplary image that may be provided as input to a facial recognition system 200 as described with respect to FIG. 2. The facial recognition system 200 may initially identify a set of registration points 112 and 114 associated with a face 112 within the pre-processed facial image 100A. The set of registration points 112 and 114 represent recognizable features within the face 112 that may be used to identify or verify an identity of an individual within the pre-processed facial image 100A. For instance, as shown, the registration 114 and 116 are cross points near the center of the eyes. In some instances, the set of registration points may be located near recognizable features of the face 112 such as, for example, locations near the nose, lips, or ears.

The facial recognition process 110 generally includes three steps: registration point detection, image normalization, and feature extraction. For instance, as described previously, registration point detection refers to detecting locations associated with the registration points 114 and 116 within the pre-processed facial image 100A. Image normalization refers to a set of image processing techniques performed by the facial recognition system 200 based at least on the detected registration points 114 and 116. For instance, the image normalization process may include adjusting the contrast of the pre-processed facial image 100A, adjusting color levels, or other image processing techniques that are commonly used to improve feature detection within a particular image. The feature extraction process refers to the generation of an image template for the processed facial mage 100B that may be used for analysis during the facial verification and identification methods described throughout this specification.

As described in greater detail below, the facial recognition system may be used to facilitate facial identification, facial verification, facial matching, and related steps including eye perturbation. An example system architecture is described below.

System Architecture

Figure 2:
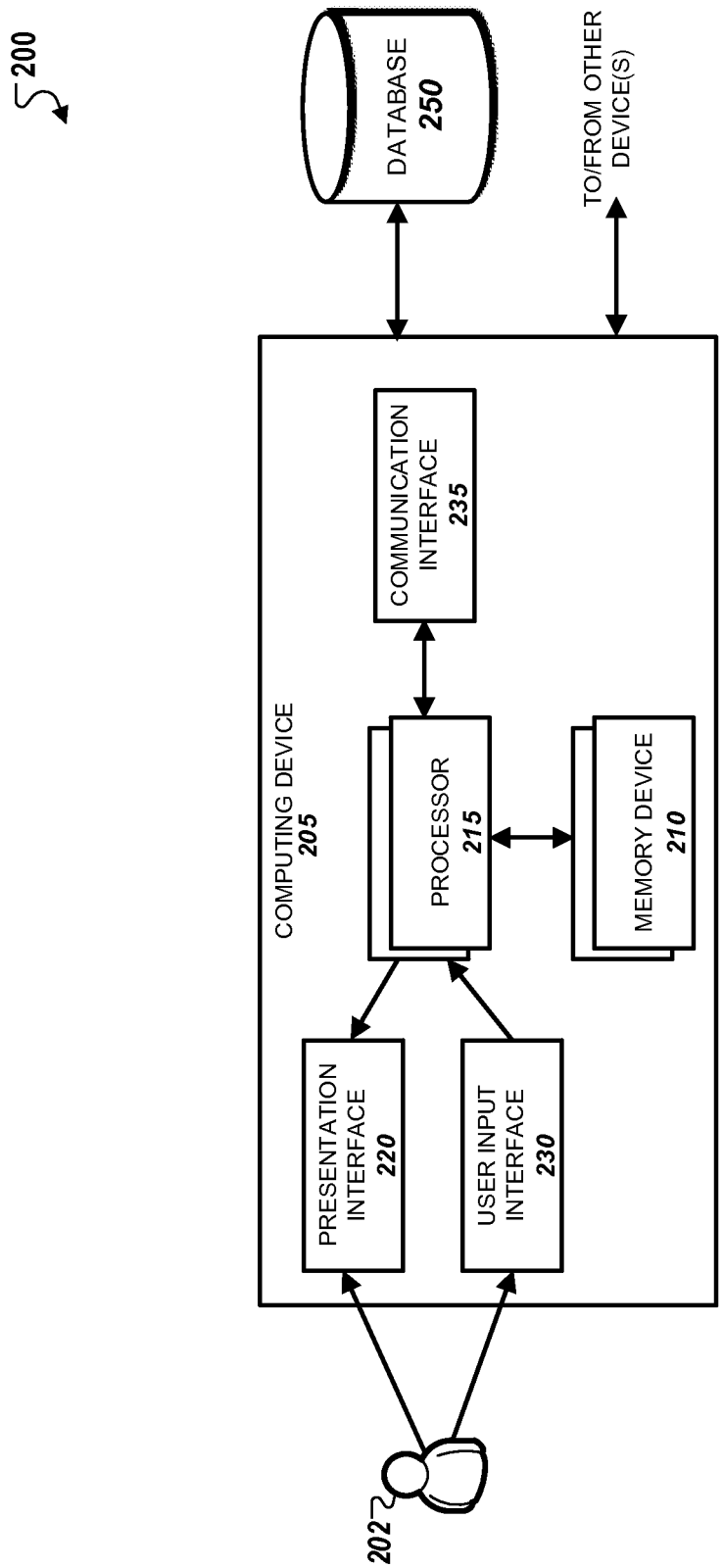
FIG. 2 is a block diagram of an exemplary facial recognition system used in facial identification and verification systems.

FIG. 2 is a block diagram of a facial recognition system 200 that may be used in facial identification, facial verification, facial matching, and other related processes described. As shown, the facial recognition system 200 may include a computing system 205 is configured to facilitate the methods and systems described throughout this specification. Alternatively, in other implementations, any suitable computer architecture that enables operation of the systems described may also be used.

The facial recognition system 200 may include a memory device 210 and a processor 215 operatively coupled to memory device 210 for executing instructions. In some implementations, executable instructions are stored in memory device 210. Facial recognition system 200 may be configurable to perform one or more operations described herein by the programming processor 215. For example, the processor 215 may be programmed by encoding an operation as one or more executable instructions and providing the executable instructions in the memory device 210. The processor 215 may include one or more processing units, e.g., without limitation, in a multi-core configuration.

In some implementations, the memory device 210 is one or more devices that enable storage and retrieval of information such as executable instructions and/or other data. The memory device 210 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

The memory device 210 may be configured to store a variety of data associated with the systems described including, for example, matching algorithms, scoring algorithms, scoring thresholds, perturbation algorithms, and fusion algorithms. In addition, the memory device 210 may be configured to store any suitable data to facilitate the methods described herein.

In some implementations, the facial recognition system 200 includes a presentation interface 220 coupled to processor 215. Presentation interface 220 presents information, such as a user interface showing data related to facial matching, to a user 202. For example, presentation interface 220 may include a display adapter (not shown) that may be coupled to a display device (not shown), such as a cathode ray tube (CRT), a liquid crystal display (LCD), an organic LED (OLED) display, and/or a hand-held device with a display. In some implementations, presentation interface 220 includes one or more display devices. In addition, or alternatively, presentation interface 220 may include an audio output device (not shown), e.g., an audio adapter and/or a speaker.

In some implementations, facial recognition system 200 includes a user input interface 230. For instance, the user input interface 230 may be coupled to processor 215 and receives input from user 202. User input interface 230 may include, for example, a keyboard, a pointing device, a mouse, a stylus, and/or a touch sensitive panel, e.g., a touch pad or a touch screen. A single component, such as a touch screen, may function as both a display device of presentation interface 220 and user input interface 230.

A communication interface 235 may be coupled to processor 215 and configured to be coupled in communication with one or more other devices such as, without limitation, another computing system (not shown), scanners, cameras, and other devices that may be used to provide biometric information such as facial images to facial recognition system 200. Such biometric systems and devices may be used to scan previously captured photographs or other image data or to capture live images of subjects. Communication interface 235 may include, without limitation, a wired network adapter, a wireless network adapter, a mobile telecommunications adapter, a serial communication adapter, and/or a parallel communication adapter. Communication interface 235 may receive data from and/or transmit data to one or more remote devices. Facial recognition system 200 may be web-enabled for remote communications, for example, with a remote desktop computer (not shown).

A presentation interface 220 and/or a communication interface 235 may be both capable of providing information suitable for use with the methods described herein, e.g., to user 202 or another device. For instance, the presentation interface 220 and the communication interface 235 may be referred to as output devices. Similarly, user input interface 230 and communication interface 235 are capable of receiving information suitable for use with the methods described herein and may be referred to as input devices.

The processor 215 and/or memory device 210 may also be operatively coupled to a database 250. Database 250 is any computer-operated hardware suitable for storing and/or retrieving data, such as, but not limited to, pre-processed facial images, processed facial images, normalized facial images, templates, extracted features, threshold values, fusion algorithms, scoring algorithms, and matching algorithms. In the exemplary implementation, database 250 is integrated in facial recognition system 200. For example, facial recognition system 200 may include one or more hard disk drives representing database 250. Moreover, for example, database 250 may include multiple storage units such as hard disks and/or solid state disks in a redundant array of inexpensive disks (RAID) configuration. Database 250 may include a storage area network (SAN), a network attached storage (NAS) system, and/or cloud-based storage. Alternatively, database 250 is external to facial recognition system 200 and may be accessed by a storage interface (not shown).

Figure 3A:
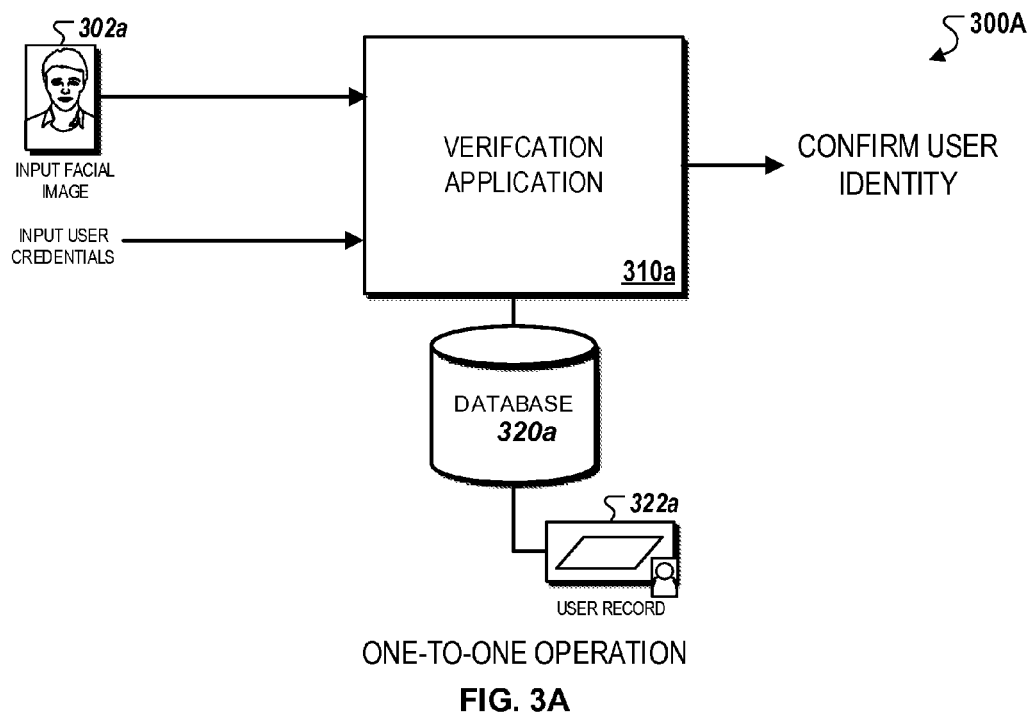
FIG. 3A is a diagram illustrating an exemplary one-to-one facial verification system.
Figure 3B:
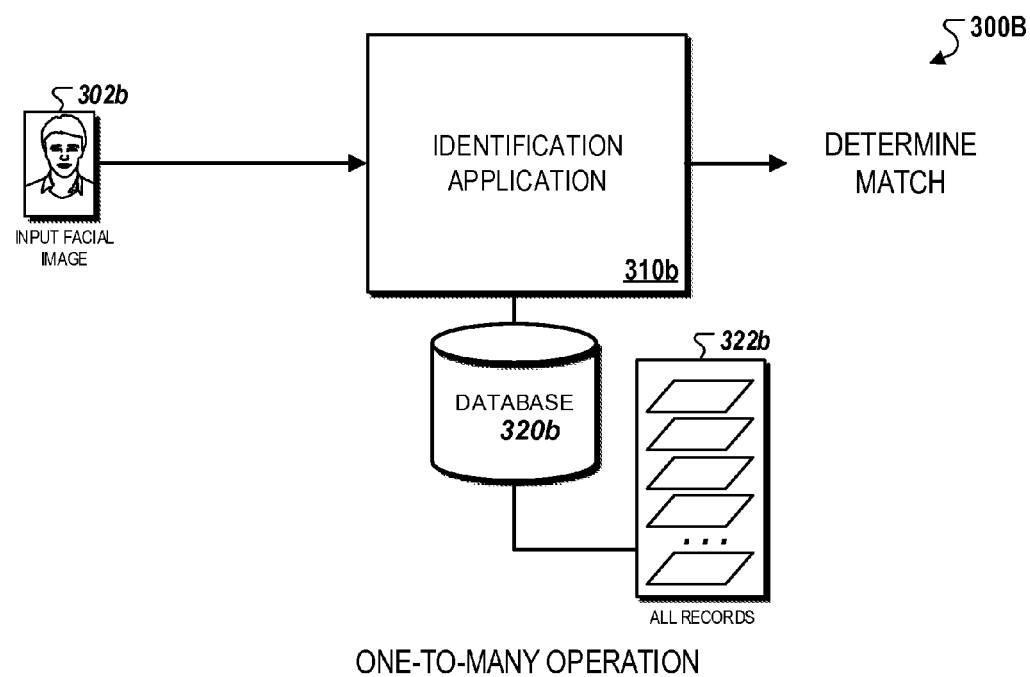
FIG. 3B is a diagram illustrating an exemplary one-to-many facial identification system.

FIGS. 3A-3B illustrate exemplary facial recognition operations that may be performed by the facial recognition system 200. For instance, FIG. 3A is a diagram illustrating an exemplary one-to-one facial verification operation 300A, and FIG. 3B is a diagram illustrating an exemplary one-to-many facial identification operation 300B.

Referring to FIG. 3A, a verification application 310a may receive an input facial image 302a and input user credentials associated with the input facial image 302a. For instance, examples of input user credentials may include an identification number associated with the input facial image or a username that is assigned to the user providing the input facial image 302a. The verification application 310a may exchange communications with a database 320a including a user record 322a. For instance, the user record 322a within the database 302a may be identified by the verification application 310a based on the input user credentials. The verification application 310a may process the input facial image 302a using the techniques described in FIG. 1, and compare features extracted from the input facial image 302a to the user record 322a to confirm the identity of the user associated with the input facial image 302a.

Referring to FIG. 3B, an identification application 310b may receive an input facial image 302b and compare the features extracted from the input facial image 302a against all records 322b within a database 320b. For instance, the identification application 310b may be used to determine if a record of a user associated with the input facial image 302b exists within the records 322b in the database 320b. In some instances, the verification application 310 may initially identify a subset of records within the database 320b that are determined, based on the features extracted from the input facial image 302b, to be similar to the user associated with the input facial image 302b. In such instances, the records 322b may include a plurality of records that have similar features to the features extracted from the input facial image 302b.

In some implementations, the verification application 310a and the identification application 310b may be software components of the facial recognition system 200. For instance, the verification application 310a and the identification application 310b may be stored on the memory device 210 and executed by the processor 215. In some instances, the verification application 310a and the identification 310b may be sub-components of a single software module that is capable of performing a facial verification and a facial identification operation of an input facial image.

Multi-Stage and Multi-Pass Facial Recognition

In general, the facial recognition system 200 may employ multi-stage matching and multi-pass matching schemes to improve facial matching performance. For instance, "multi-stage matching" refers to various matching procedures of a facial matcher. For instance, as described with respect to FIGS. 4B, 4C, 5B, and 5C, multi-stage matching may include a feature extraction stage where templates associated with facial images to be compared are generated, followed by a template comparison stage where a similarity score between the respective templates of the facial images may be computed. The multi-stage matching scheme may additionally include a decision logic stage where values of various similarity scores may be compared to threshold values to determine whether an input facial image matches one or more other facial images.

In some instances, where there is no suitable match found, the multi-stage matching scheme may additionally include an perturbation stage where registration points within the input facial image may be perturbed and compared against other facial images using more computationally-intensive matching procedures that are more likely to determine a match. In this regard, the multi-stage matching scheme may be used to improve computational resource allocation by initially using a "first-pass" matching operation, and subsequently performing a "second-pass" perturbation operation if the initial comparison results no suitable matches. As a result, the use of the sequential matching procedures may be used to improve overall matching accuracy in instances where the input facial image includes severe distortion, and/or reduce the computational resources associated with performing a matching in other circumstances where a match is readily found for another input facial image.

As described, "multi-pass matching" refers to a set of different facial matching techniques that are invoked conditionally and sequentially to improve facial matching accuracy. For instance, as described with respect to FIGS. 4D and 5D, multiple facial matchers, with varying levels of precision, may be used sequentially to perform a fingerprint recognition operation. For instance, a first facial matcher may be used to identify stronger matching candidates, and terminate the matching procedure after computing a similarity score that satisfies a preset threshold. In other instances, where a strong matching candidate is unable to be identified by the first facial matcher, a second facial matcher may be used to perform a more thorough comparison technique. In such instances, the second facial matcher may include additional comparison techniques to increase the likelihood of generating match between candidates. In this regard, successive facial matchers may be applied conditionally upon a determination that a minimum quality is unable to be determined. As a result, the facial recognition system 200 may use a coarse-to-precise facial matching operation to use coarse matching techniques with candidates that are easily identifiable, while using precise matching technique to improve the matching accuracy of candidates that are not as easily identifiable.

Exemplary verification and identification systems are described in more detail below with respect to FIGS. 4A-4D, and FIGS. 5A-5D. Although two exemplary implementations of the facial recognition system 100 are described, other implementations of the facial recognition system 200 may also be possible.

Eye Perturbation Techniques

As described in FIG. 1, the facial recognition system 200 detects registration points 114 and 116 to generate the normalized image 1008. The coordinates of registration points such as the registration points 114 and 116 may be used to estimate the geometric transformation used in normalizing facial images for feature extraction. Perturbation refers to the alteration of coordinates associated with registration points to alter estimated geometric transformation parameters such as, for example, scale, translation and rotation. For instance, alteration of coordinates associated with registration points may affect feature extraction. In one example, the perturbation techniques may be applied to eye localization to identify registration points that are associated with eyes within an input facial image. Since the accuracy of eye localization is important for facial matching accuracy, perturbation techniques may be used to improve eye localization. In addition, since image quality may vary depending on the particular biometric equipment used (e.g., camera or scanner types) and conditions of facial image capture, the ability to extract the locations of registration points 114 and 116 accurately may vary. In such instances, perturbation techniques may be used to detect the registration points 114 and 116 using varying specifications.

The perturbation techniques, as described throughout this specification, may be used by the facial recognition system 200 to robustly detect the registration points 114 and 116 invariantly to localization variations within a facial image. For instance, the perturbation techniques may be used to improve matching accuracy during conditions where localization errors may be present with the registration points.

After performing the perturbation techniques, the facial recognition system 200 may average similarity scores associated to generate a final similarity score between a pair of the candidate facial images (e.g., an input facial image, and reference facial image). For instance, the facial recognition system 200 may initially generate a plurality of perturbed image templates associated with a particular perturbation of an input image. The facial recognition system 200 may then compute similarity scores for each perturbation template based on comparing the perturbed templates to a gallery template. For example, the similarity scores indicate levels of variation between a pair of prints (e.g., a larger variation for non-mated image pairs compared to mated image pairs). An average similarity score for the plurality of perturbed image templates may then be computed. More particular descriptions of the perturbation techniques are described with respect to FIGS. 4D and 5D.

One-to-One Verification System

FIGS. 4A-4D illustrate various facial verification processes that may be used by an exemplary one-to-one verification system. A one-to-one verification operation, as described throughout this specification, refers to a biometric system (e.g., the facial verification system 200) receiving an input facial image along with a user credential such as a password, token, username, or a combination of credentials, to claim a user identity. The user credential is used to retrieve a set of pre-enrolled templates that are associated with the user, and then compared to the input facial image.

A one-to-one verification system may have two components: an offline processing module, and an online verification module. The offline processing module may be used to generate a gallery dataset and an offline reference dataset by initially enrolling facial images not associated with any of gallery images. For example, the size of the reference dataset may be determined by the one-by-one verification false acceptance rate (FAR) requirement. The offline processing module may then perform the processing techniques described with respect to FIG. 1, to generate a set of reference templates.

During online verification, the registration points from an input facial verification image may be detected and used to generate a feature template for the input facial image. The multi-stage and multi-pass facial recognition processes, as described previously, may be performed to verify the input facial images by comparing the feature template to the set of reference templates.

Figure 4A:
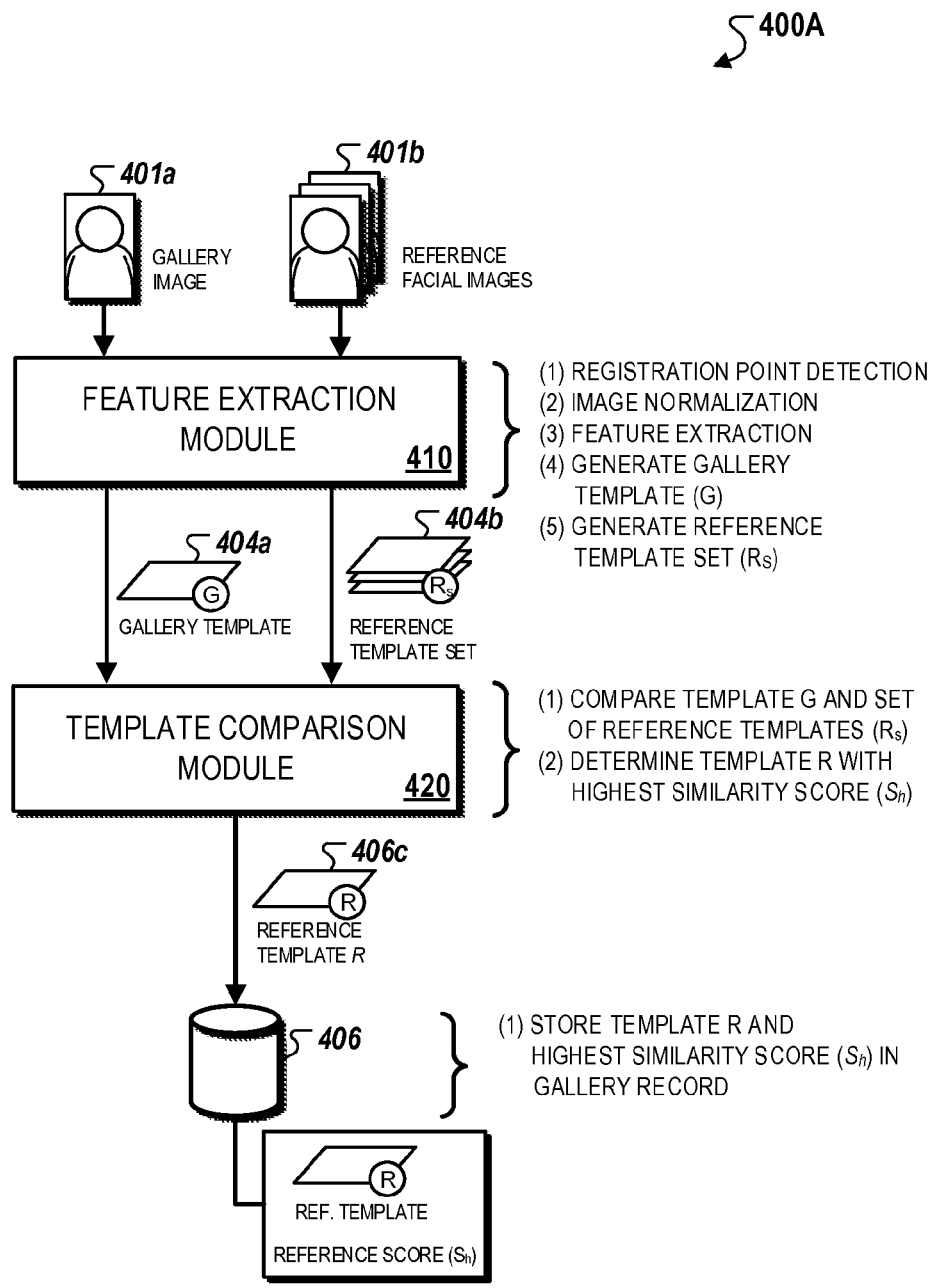
FIG. 4A is a flow chart illustrating an offline process used in a one-to-one facial verification system.

FIG. 4A is a flow chart illustrating an offline process 400A used in a one-to-one facial verification system. For instance, the facial verification system may include a feature extraction module 410, a feature extraction module 410, and a template comparison module 420. Briefly, the process 400A may include the feature extraction module 410 receiving a gallery image 401a and a set of reference facial images 401b. The feature extraction module 410 may generate a gallery template 404a for the gallery image 401a, and a reference template set 404b for the set of reference facial images 401b. The template comparison module 420 may compare the generated gallery template 404a to each of the reference templates within the reference template set 404b to identify a reference template 406c with the highest similarity score. The reference template and its associated highest similarity score (also referred to as "reference score") ($S_h$) may be stored in a database 406.

In more detail, the feature extraction module 410 may generate the gallery template 404a and the reference template set 404b using the processing techniques as described with respect to FIG. 1. For instance, the feature extraction module 410 may detect registration points within the gallery image 401a and the reference facial images 401b, normalize the gallery image 401a and each of the reference facial images 401b, and generate the gallery template 404a and the reference template set 404b, which include features extracted from the normalized images.

The template comparison module 420 may compute a similarity score between the gallery template 404a and each reference template included in the reference template set 404b. The template comparison module 420 may use the computed similarity scores to identify a particular reference template 406c with the highest similarity score. The reference template 406c its associated similarity score (or the reference score) ($S_h$) may then be stored in the database 406 for use during an online verification operation.

Figure 4B:
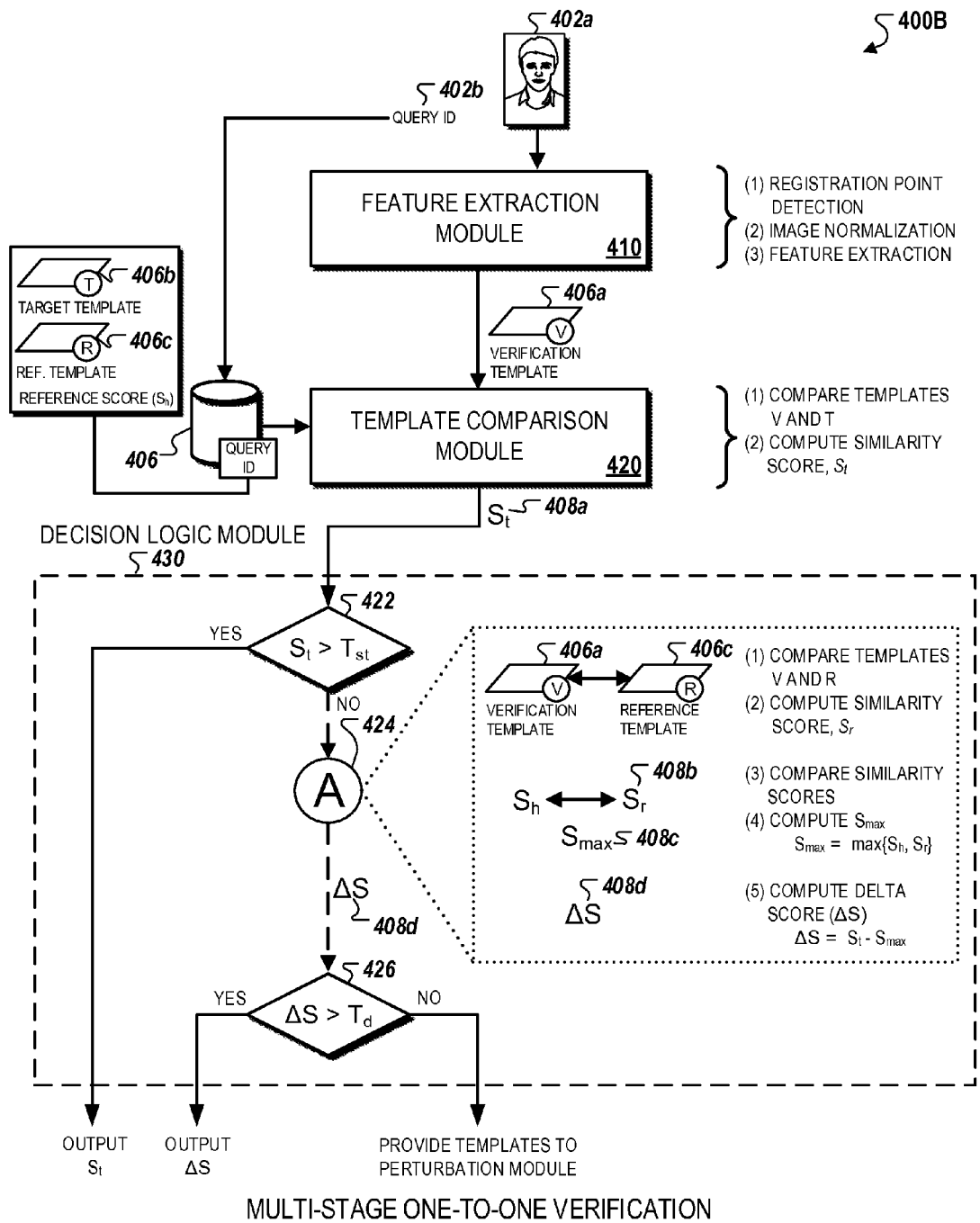
FIG. 4B is a flow chart illustrating an exemplary multi-stage facial matching process 400B in a one-to-one facial verification system.

FIG. 4B is a flow chart illustrating an exemplary multi-stage facial matching process 400B in a one-to-one facial verification system. For instance, the feature extraction module 410 may receive an input facial image 402a and generate a verification template 406a for the input verification image 406a. The input verification image 402a may be provided with a query identifier 402b, which is a user credential, used to identify a user record within a database 406. The feature comparison module 410 may then provide the verification template 406a to a template comparison module 420.

The template comparison module 410 may then retrieve, from the database 406, the user record that includes the reference template 406c, a target template 406b, and the reference score ($S_h$). The template comparison module 410 may then compare the verification template 406a and the target template 406b to compute a similarity score 408a. The template comparison module 420 may then provide the similarity score 408a to a decision logic module 430.

The decision logic module 430 may then perform a set of conditional operations in order to verify the identity of a user associated with the input verification image 402a. For instance, the decision logic module 430 may initially compare the similarity score 408a to a threshold, $T_{st}$, in decision point 422. If the similarity score exceeds the threshold, then the decision logic module 430 outputs the similarity score 408a and determines that the input verification image 402a is verified.

Alternatively, if the decision logic module 430 determines that the similarity score 408a does not exceed the threshold value in decision point 422, the decision logic module 430 may perform an operation 424. For instance, as shown, the operation 424 may include comparing the verification template 406a and the reference template 406c, and compute a reference similarity score ($S_r$) 408b. The reference similarity score 408b may be compared to the reference score that was computed in the offline processing operation 400A. For instance, a max score ($S_{max}$) 408c may be computed by selecting the larger of the reference similarity score 408b and the reference score. The max score 408c may then be used to compute a delta score ($\Delta S$) 408d, which represents a difference between the similarity score 408a and the max score 408c. The delta score 408d is then compared to a second threshold, $T_d$, at decision point 426.

If the value of the delta score exceeds the value of the second threshold, then the decision logic module 430 outputs the delta score as the final similarity score and determines that the input facial verification image 402a has been verification. Alternatively, if the delta score 408d is less than the value of the second threshold, then a perturbation operation may be performed on the input facial verification image 402a.

Figure 4C:
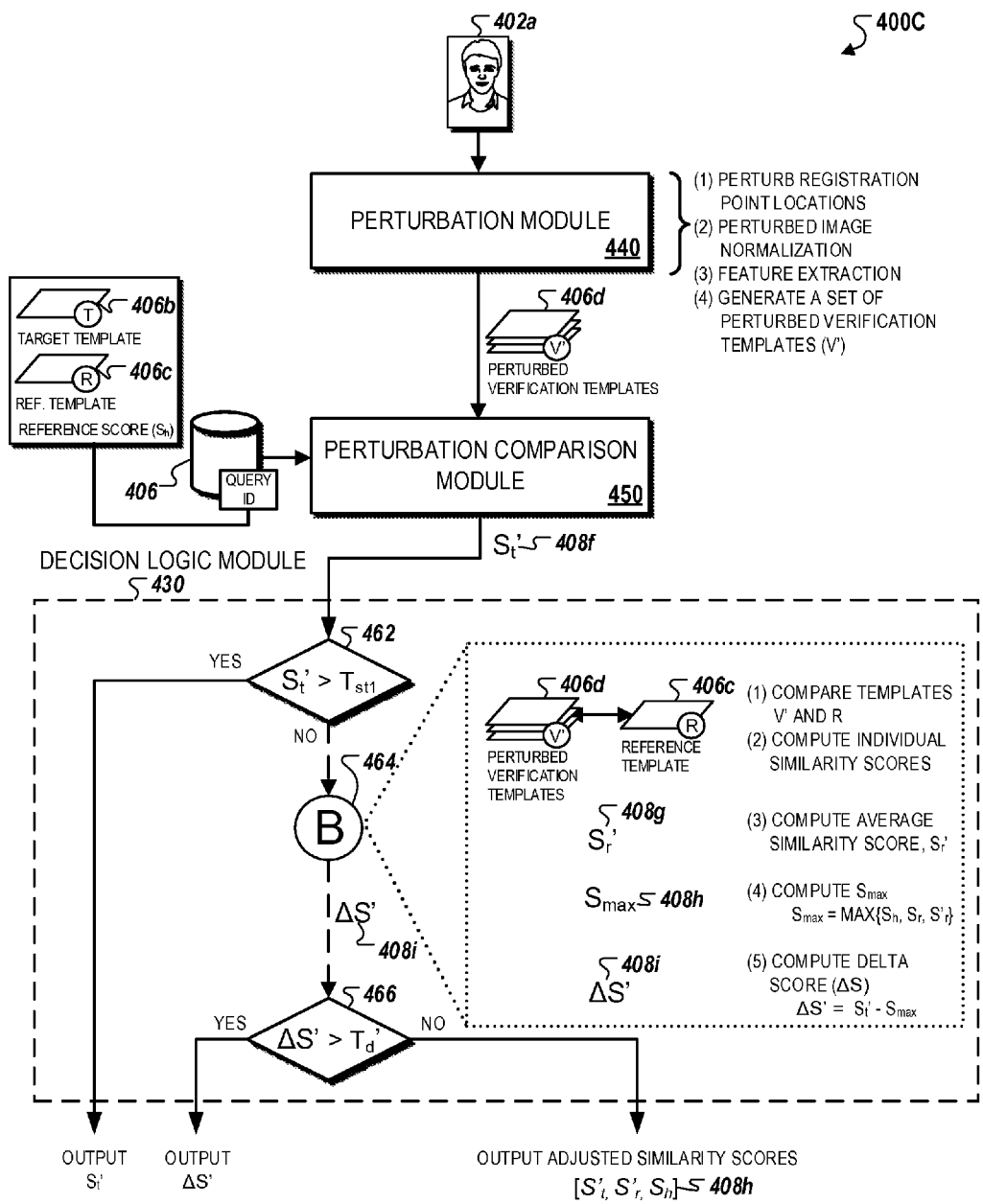
FIG. 4C is a flow chart illustrating an exemplary perturbation operation for facial matching in a one-to-one facial verification system.

FIG. 4C is a flow chart illustrating an exemplary perturbation operation 400C for facial matching in a one-to-one facial verification system. For instance, a perturbation module 440 may perform a perturbation operation on the input facial verification image 402a based on the detected registration points within the input facial verification image 402a.

As described previously, the perturbation operation may include perturbing locations of the detected registration points using various configurations and generating a plurality of perturbation templates, each of which represent features associated with a particular perturbation configuration. To reduce the computational resources needed to perform the perturbation operation, the perturbation module 440 may initially determine a range of perturbation and a step size for the perturbation based on empirical data that is generated during a design stage conducted prior to the perturbation operation.

The configuration of the perturbation operation may also be based on a quality associated with the input facial verification image. For instance, a larger perturbation range or a greater number of perturbation points may be used for low quality prints due to an increased number of expected errors within a low quality print. In other instances, other parameters that may impact the configuration of the perturbation operation may include pose variation, lightening, eye distance, eye resolution within the input facial verification image. In other instances, the parameters may additionally include the presence of closed eyes, eye glasses or blurriness within the input facial verification image.

In some implementations, the perturbation operation may include comparing a variation difference between locations of the detected registration points within the input verification facial image 402a and ground truth locations for facial images with similar quality levels. For instance, the perturbation module 440 may compute statistical information such as, for example, an average number of errors or the standard deviation of errors. The perturbation module 440 may use the statistical information to determine a maximum perturbation range and a step size for each of group of perturbed images with similar qualities.

After determining the perturbation parameters (e.g., maximum perturbation range and step size), the perturbation module 440 may perform the perturbation operation to coordinate positions of the detected registration points within the input verification facial image 402a. As shown in FIG. 1, in implementations where eye locations are used as registration points, the perturbation procedure may be applied to the coordinates associated with registration points corresponding to each eye. The perturbation module 440 may then generate a set of perturbation verification templates 406d for each of the perturbed verification images. The set of perturbation verification images 406d may then be provided to a perturbation comparison module 450.

The perturbation comparison module 450 may retrieve, from the database 406, the verification template 406a, the target template 406b, and the reference template 406 that were generated during the multi-stage verification operation. The perturbation comparison module 450 may compare the target template 406b to each perturbation template included within the perturbed verification templates 406d. In some instances, the perturbation comparison module 450 may initially compute individual similarity scores between the target template 406b and each perturbation template, and then aggregate the individual similarity scores to generate a similarity score $(S_t')$ 408f. For instance, the similarity score 408f may then be evaluated against a threshold value by the decision logic module 430 in a similar manner as the similarity score 408a. For example, if the similarity score 408f exceeds the threshold value, $T_{st1}$, then the perturbation procedure may terminate because the decision logic model 430 determines that the input verification image 402a has been verified, and output the similarity score 408f as the final similarity score.

Alternatively, if the value of the similarity score 408f is less than the threshold value, $T_{st1}$, the decision logic module 430 may perform an operation 464. For instance, the operation 464 may include comparing the reference template 406c to each perturbation template included in the set of perturbation verification templates 406d. The decision logic module 430 may initially compute individually similarity scores between each perturbed template and the reference template 406c and then aggregate the individual similarity scores to generate an average reference similarity score $(S_r')$ 408g.

The average reference similarity score $(S_r')$ 408g, the reference score $(S_h)$ and the reference similarity score $(S_r)$ 408b may be used to compute a max score $(S_{max})$ 408h, which may then be used to compute a perturbed delta score $(\Delta S)$ 408i. The perturbed delta score 408i is similar to the delta score 408d in that they may be used by the decision logic module 430 to determine if the verification template 406a or the set of perturbed verification templates 406d include a template that is sufficiently similar to the reference template 406c to determine that the input facial verification image 402a is verified. For instance, the perturbed delta score 408i may be compared to a threshold, $T_d'$, in decision point 466. If the value of the perturbed delta score 408i exceeds the threshold value, then the perturbed delta score 408i may be outputted as the final similarity score, and the input facial verification image 402a may be determined to be verified.

Alternatively, if the perturbed delta score is less than the threshold value at decision point 466, then the decision logic module 430 may instead output a set of adjusted similarity scores that includes the similarity score 408f, the similarity score 408g, and the reference score. For instance, as described with respect to FIG. 4D, in some instances, the set of adjusted similarity scores 408h may be provided to a second facial matcher that to perform a finer matching operation.

Figure 4D:
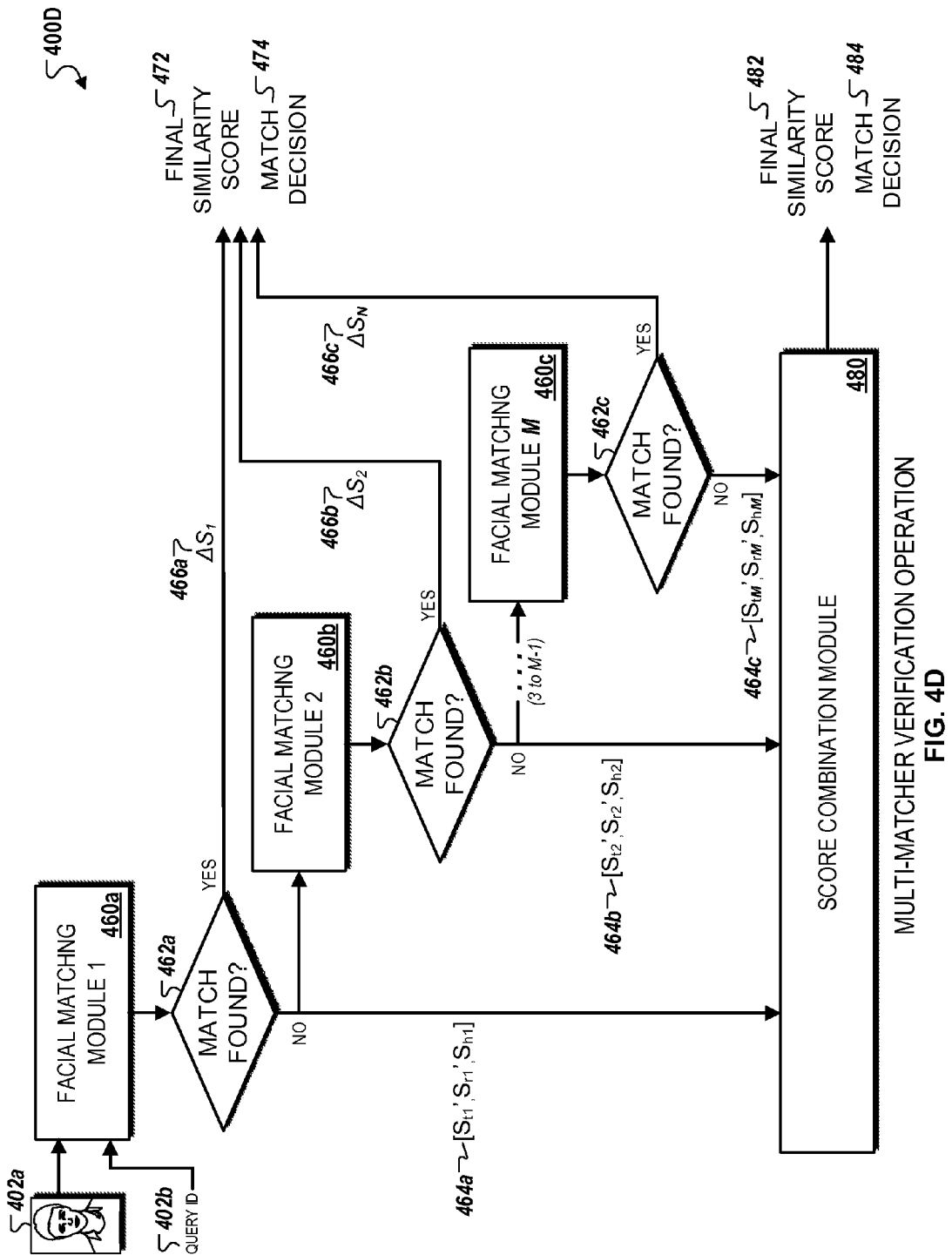
FIG. 4D is a flow chart illustrating an exemplary multi-pass fusion process using different facial matchers in a one-to-one facial verification system.

FIG. 4D is a flow chart illustrating an exemplary multi-pass fusion process 400D using different facial matchers in a one-to-one facial verification system. For instance, the process 400D may include a plurality of facial matching modules that may be used in a coarse-to-fine fashion to identify candidate templates for a facial verification operation. For example, as shown, the multiple facial matchers may include facial matching modules 460a-460c. Although three facial matchers are illustrated in FIG. 4D, in some implementations, additional facial matchers may be used based on the expected localization errors and quality of the input facial verification image 402a.

The facial matching modules 460a-460c represent individual facial matchers that may be used to perform the techniques represented in FIGS. 4A-4C. For instance, each of the facial matching modules 460a-460c may include the feature extraction module 410, the template comparison module 420, the decision logic module 430, the perturbation module 440, and/or the perturbation comparison module 450. In some implementations, the facial matchers 460a-460c may have different sensitivities such that the individual facial matchers may be configured to perform facial verification operations with different computational requirements (e.g., resource allocation) and with different levels of precision. For instance, the values of the thresholds, $T_{st}$, $T_d$, $T_{st1}$, and $T_d'$, may be adjusted to increase the sensitivity of the facial verification operations as represented in FIGS. 4B-4C.

The process 400D may include the facial matching module 460a initially receiving the input facial verification image 402a and the query identifier 402b. The facial matching module 460a may then perform the multi-stage facial verification operation to determine if there is a match found within a reference database at the decision point 462a. As described in FIGS. 4B and 4C, the decision point 462a may correspond to the decision points 422 or 426 in FIG. 4B or the decision points 462 and 466 in FIG. 4C, depending on the characteristics of the input facial verification image 402a. As shown, if a match is found by the facial matching module 460a at the decision point 462a, then the facial matching module 460a may output a similarity score 466a as a final similarity score 472 and a match decision indicating that the input facial verification image 402a has been verified.

Alternatively, if no match is found at the decision point 462a, then a set of adjusted similarity scores 464a, which are generated during a perturbation operation performed by the facial matching module 460a, may be provided to a score combination module 480. In some instances, the set of similarity scores 464a may correspond to the set of similarity scores 408h as shown in FIG. 4C.

In addition to providing the set of similarity scores 464a to the score combination module, the process 400D may continue with a facial matching module 460b, which may subsequently perform a more precise, more resource-intensive facial verification operation of the input facial verification image 402a. For example, in some implementations, the second facial matching module 460b may use a greater perturbation range or a smaller step size to generate a greater number of perturbed verification templates to improve the likelihood of finding a match. In other implementations, additional verification operations that were not performed by the first facial matching module 460a may be performed to determine if a match exists in the decision point 462b. Similar to the decision point 462a, the second facial matching module 460b, and all other subsequent facial matchers such as the facial matching module 460c, may perform similar operations to determine if a match is found within a fingerprint verification operation.

As shown in FIG. 4D, the process 400D may terminate in two ways. For instance, if any of the multiple facial matching modules 460a-460c detect, during a respective verification stage, a match for the input facial verification image 402a, the respective facial matching module may output the respective score from the particular stage as the final similarity score 472, and a corresponding match decision 474 at the facial verification operation. Alternatively, if at each subsequent facial verification stage, each respective facial matching module is unable to find a match for the input facial verification image 402a, then the set of adjusted similarity scores 464a-464c may be provided to the score combination module 480.

The score combination module 480 may combine (or "fuse") the values of the set of adjusted similarity scores 464a-464c to determine, at the end of the process 400D if a match exists, and provide the combination of the values of the set of adjusted similarity scores 464a-464c as the final similarity score 482. In addition, the score combination module may also output a match decision 484.

In some implementations, the score combination module 480 may additionally perform a verification operation to determine if the combined set of scores indicates a match to the input facial verification image 402a. For instance, the score combination module 480 may use similar comparison techniques to the facial matching modules 460a-460c to determine if the combined values of the adjusted similarity scores satisfy a particular threshold to determine if a match is found. In this regard, the process 400D may be used to perform subsequent facial matching operations in a coarse-to-fine fashion where the set of similarity scores generated from a particular facial verification stage may be provided to the score combination module 48 when the particular stage terminates prior to the initialization for the subsequent stage initiates. The score combination module 480 may thus be used as a last resort matcher that aggregates the results of the individual facial matchers to further determine if a match may be present.

One-to-Many Identification System

FIGS. 5A-5D illustrate various facial identification processes that may be used by an exemplary one-to-many facial identification system. A one-to-many facial identification system, as described throughout this specification, represents a biometric system (e.g., the facial recognition system 200) that captures a facial image and compares the captured facial image against a plurality of records, or a template, within a pre-enrolled database. Compared to a one-to-one verification operation, where the objective is to verify the identity of a user using pre-collected facial images, during a one-to-one identification operation, the identity of the user within an input facial image is unknown and thus requires a greater number of comparisons.

Similar to the one-to-one verification system, a one-to-many identification system may have two components: an offline processing module, and an online identification module. The offline processing module may be used to generate an offline gallery template dataset. For example, as described with respect to FIG. 5A, a set of gallery templates may be processed to generate a set of gallery templates.

During online identification, the registration points from an input facial identification image may be detected and used to generate a feature template for the input identification image. The multi-stage and multi-pass facial recognition processes, as described previously, may then be performed to verify the input facial images by comparing the feature template to a set of gallery templates.

Figure 5A:
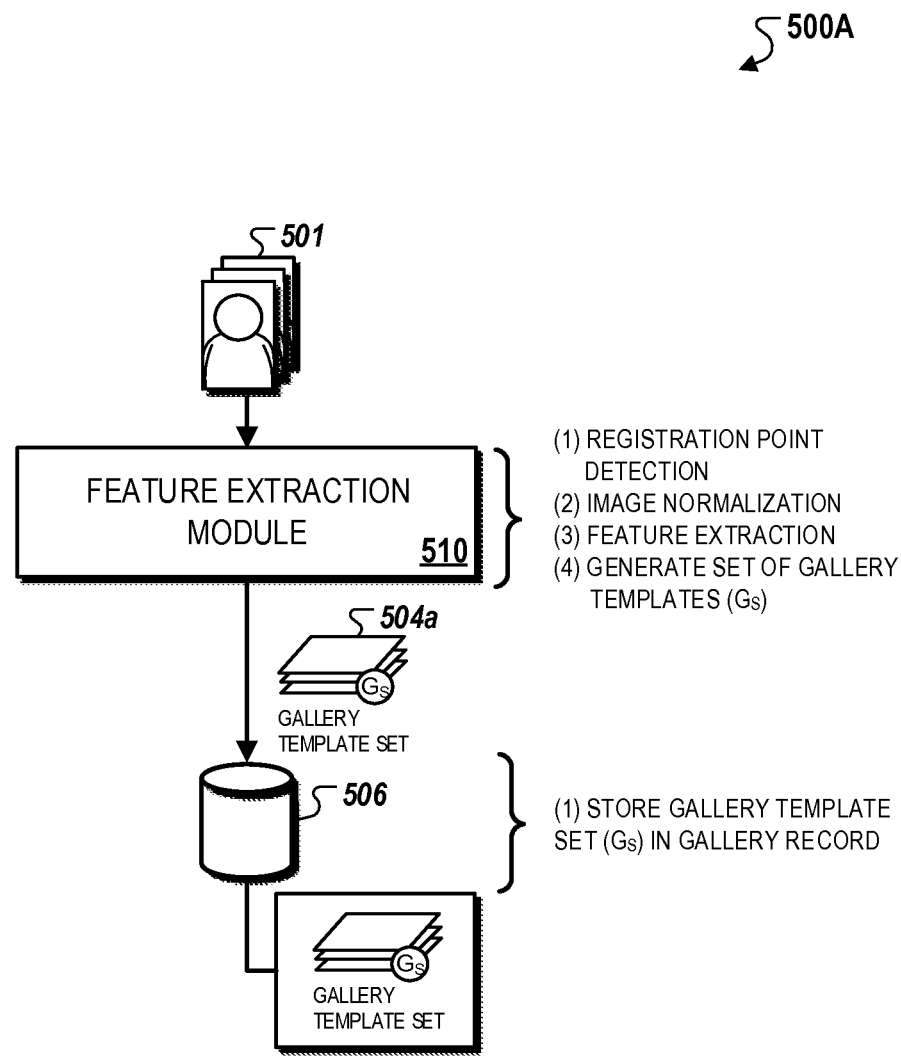
FIG. 5A is a flow chart illustrating an exemplary offline processing of a one-to-many facial recognition system.

FIG. 5A is a flow chart illustrating an exemplary offline processing operation 500A of a one-to-many facial recognition system. For instance, the facial identification system may include a feature extraction module 510. Briefly, the process 500A may include the feature extraction module 510 receiving a set of gallery images 501. The feature extraction module 510 may generate a gallery template set 504a that includes a gallery template for each gallery image within the set of gallery images 501. The gallery template set 504a may then be stored in a database 506 for use for comparison in an online facial identification operation.

Figure 5B:
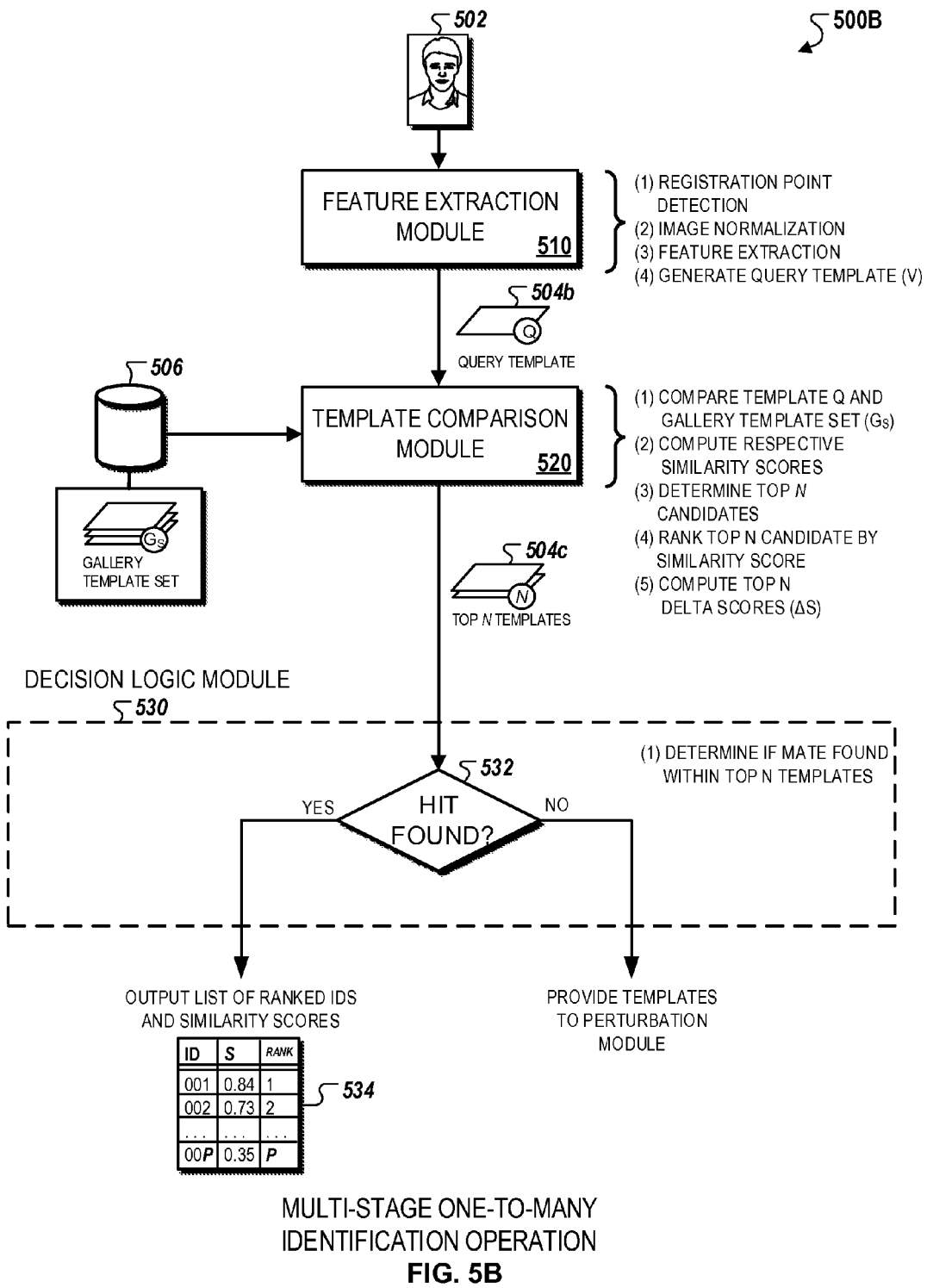
FIG. 5B is a flow chart illustrating multi-stage facial matching in the one-to-many facial recognition system.

FIG. 5B is a flow chart illustrating multi-stage facial matching in the one-to-many facial recognition system. For instance, the feature extraction module 510 may receive an input facial identification image 502 and generate a query template 504b using techniques described previously with respect to FIG. 1. The query template 504b may then be provided to the template comparison module 520.

The template comparison module 520 may then retrieve the gallery template set 504a that was previously generated during the offline enrollment process and stored in the database 506.

In some implementations, instead of retrieving all of the gallery templates stored in the database 506, the template comparison module 520 may perform an initial threshold analysis to select a subset of the gallery templates stored in the gallery template set are likely to represent match candidates to the input facial identification image 502. For instance, the template comparison module 520 may identify a set of characteristics from the query template 504b, and use the characteristics to discard particular gallery templates that are unlikely to be a match for the input facial identification image 502. Similarly, during instances where there are significant number of records within the database 506, the template comparison module 520 may use other parameters to filter all of the records within the database 506, and only select particular gallery templates that may be match candidates for the input facial identification image 502. For instance, the number of gallery templates selected may be adjusted based on the computational resources available to perform a facial identification operation, or based on speed requirements for the facial identification operation.

After retrieving the gallery template set 504a from the database 506, the template comparison module 520 may compare the query template 504b with each gallery template included in the gallery template set 504a. For instance, the template comparison module 520 may compute an individual similarity score between the query template 504b and a particular gallery template, and then sort each of the individual similarity scores to identify a subset of the gallery template set 504a with the highest individual similarity scores. For example, the subset of gallery template 504a may be selected and designated as the top N templates 504c, where N represents the number of gallery templates selected from the gallery template set 504a based on the values of individual similarity scores.

In some implementations, the number of gallery templates included in the top N templates 504c may be adjusted based on the requirements for the facial identification operation. For instance, the number of top N templates 504c may be based on the FAR requirement, a target matching speed, or the amount of available computational resources available. As described in FIG. 5D, during a multi-pass facial identification process, the number gallery templates within the top N templates 504c may differ between different facial matchers that are applied consecutively during the multi-pass facial identification process.

After selecting the top N templates 504c, a decision logic module 530 may perform a determination procedure to identify match candidates for the input facial identification image 502. For instance, the determination procedure may include decision point 532, where the decision logic module 530 determines if at least one of the gallery templates within the top N templates 504c is a mate for the input facial identification image 502. If mates are found within the top N templates 504c, then the decision logic module 530 may output a list 534 that includes gallery identifiers for each mated gallery template, respective similarity scores for each mated gallery template, and an associated rank based on the value of the respective similarity scores for each mater gallery template. As shown in the example in FIG. 5B, the gallery template "001" is identified to be the highest ranked mated gallery template because its similarity score indicates the highest likelihood that the gallery image "001" is a match for the input facial identification image 502.

Alternatively, if the decision logic module 530 is unable to identify at least one mate for the query template 504b within the top N templates 504c, a perturbation operation, as described previously with respect to FIGS. 4B-4C, may be performed on the input facial identification image 502 to improve the likelihood of identifying at least one gallery template mate for the input facial identification image.

Figure 5C:
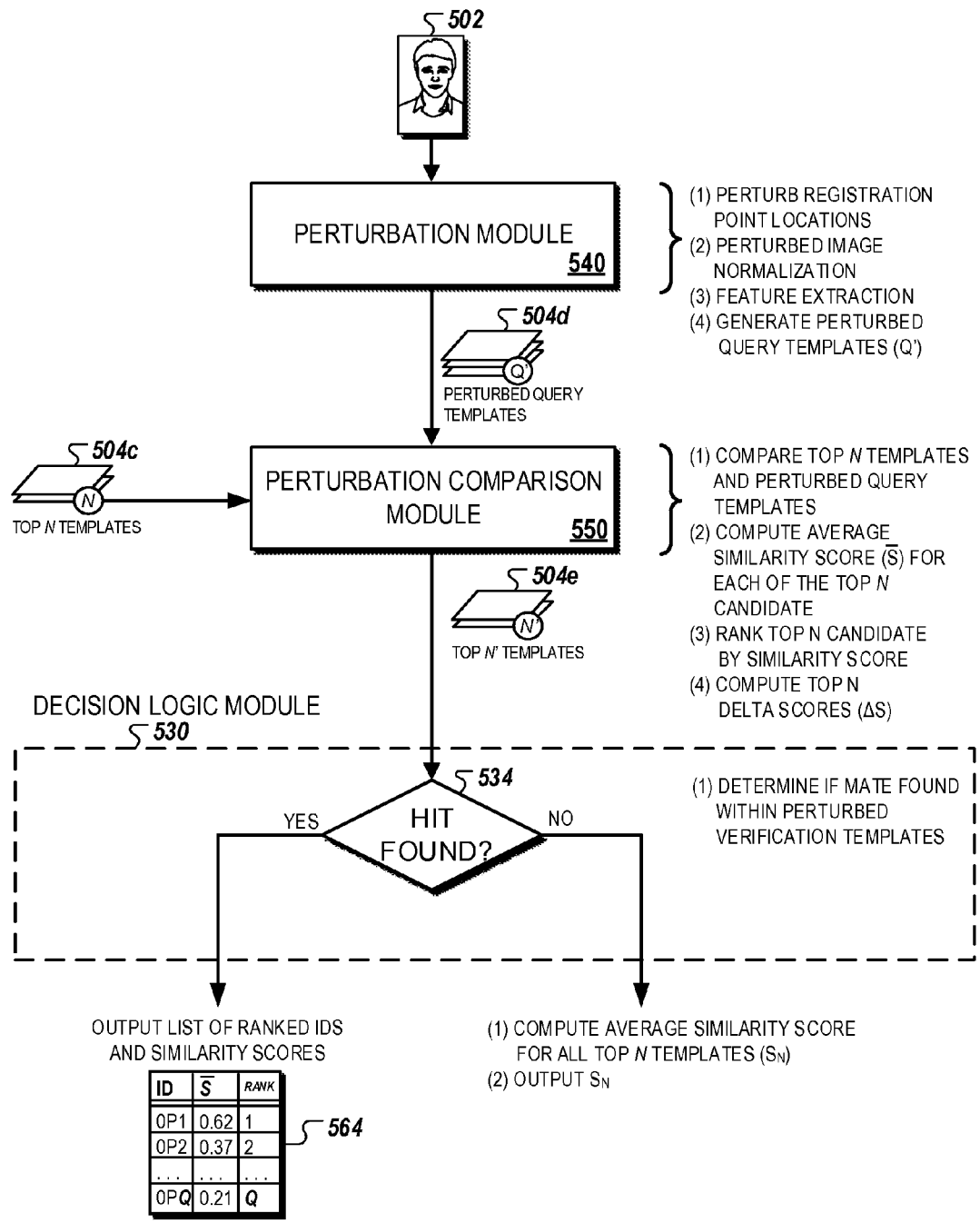
FIG. 5C is a flow chart illustrating an exemplary perturbation operation for a one-to-many facial identification system.

FIG. 5C is a flow chart illustrating an exemplary perturbation operation 400C for a one-to-many facial identification system. For instance, a perturbation module 540 may perform the perturbation operation on the input facial identification image 502 based on the detected registration points within the input facial identification image 502.

As described previously, the perturbation operation may include perturbing locations of the detected registration using various configurations and generating a plurality of perturbation templates, each of which represent features associated with a particular perturbation configuration. The perturbation module 540 may generate a set of perturbed query templates 504d, and then provide the set of perturbed query templates 504d to a perturbation comparison module 550.

The perturbation comparison module 550 may then retrieve the top N templates 504c, which were generated during the multi-stage facial identification process 400B. The perturbation comparison module 550 may then compare each of the top N templates 504c with each of the perturbed query templates 504d. For instance, the perturbation comparison module may initially compare an average similarity for each gallery template within the top N templates 504c based on aggregating similarity scores for each of the perturbed query templates 504d. The perturbation comparison module may then sort each gallery template within the top N templates 504c by the respective value of its average similarity score, and identify a subset of gallery templates that have the highest average similarity scores with the perturbed query templates 504d. The subset of gallery templates may be designated as the top N' templates 504e, which refer to the top gallery templates after performing the perturbation procedure. As described previously with respect to FIG. 5B, the number of gallery templates selected may be adjusted based on the desired sensitivity of the perturbation operation, and may vary between multiple facial matchers using in a multi-pass facial identification operation.

After identifying the top N' templates 504e, the decision logic module may perform a determination procedure to identify match candidates for the input facial identification image 502. For instance, the determination procedure may include decision point 534, where the decision logic module 530 determines if at least one of the gallery templates within the top N templates 504c is a mate for the input facial identification image 502. As described previously with respect to FIG. 5B, if the decision logic module determines that at least one gallery template within the top N' templates 504e is a mate for the input facial identification image 502, then the decision logic module 530 may output a list 564 that includes a gallery identifier associated with the mated gallery templates within the top N' templates 504e, a respective average similarity score between the mated gallery template and the set of perturbed query templates 504d, and a rank associated with the mated gallery template based on the value of the respective average similarity score.

Alternatively, if the decision logic module 530 is unable to identify a mated gallery template within the top N' templates 504e, then the decision logic module 530 may compute an average similarity score, $S_N$, for all of the gallery templates within the top N' templates 504e. The decision logic module 530 may then output the average similarity score, $S_N$. In some implementations, such as the multi-pass facial identification process shown in FIG. 5D, the average similarity score, $S_N$, may be provided for out to a similarity combination module, which may combine the average similarity scores computed by multiple facial matchers.

Figure 5D:
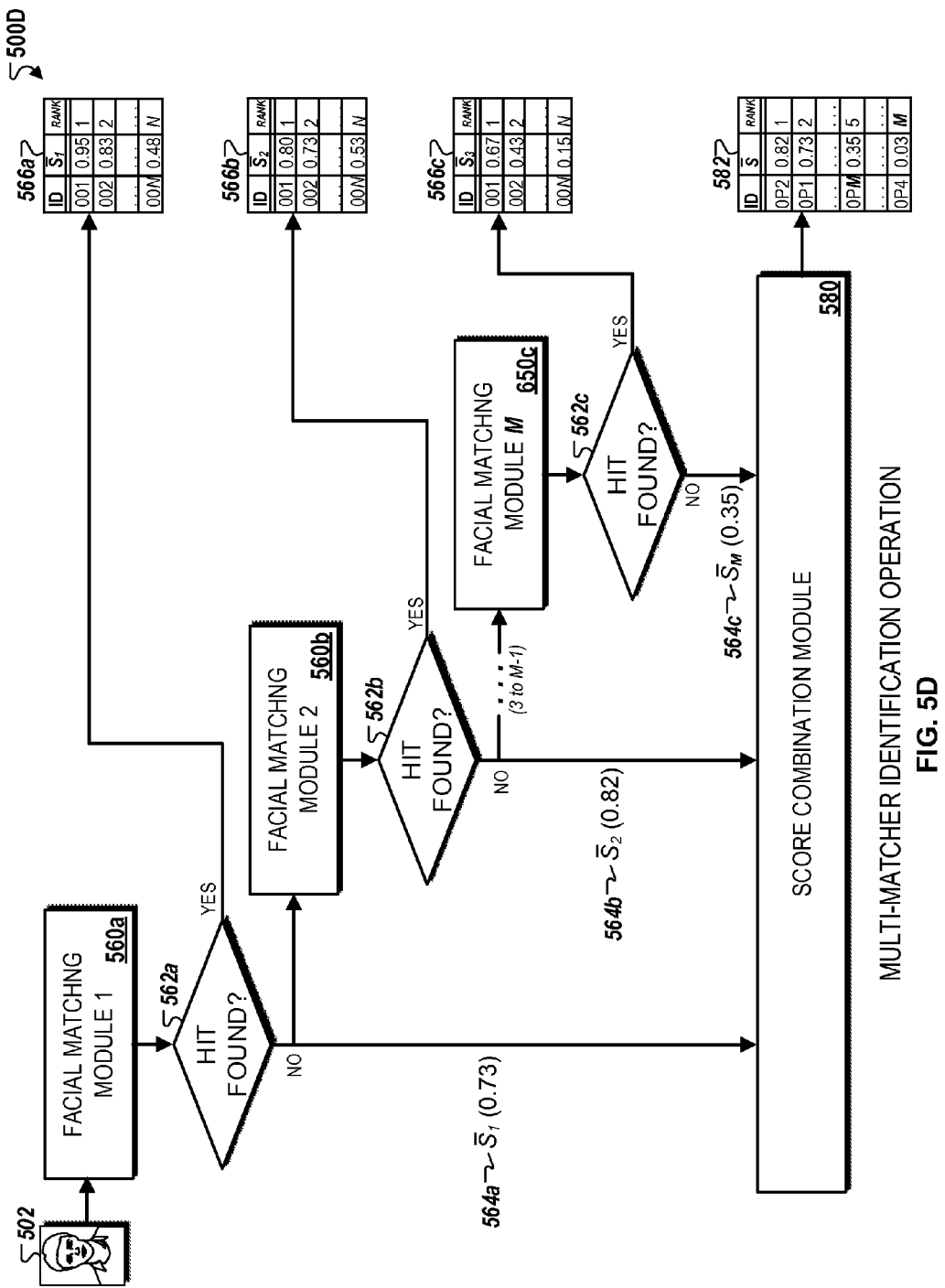
FIG. 5D is a flow chart illustrating an exemplary multi-pass fusion process using different facial matchers in a one-to-many facial recognition system.

FIG. 5D is a flow chart illustrating an exemplary multi-pass fusion process 500D using different facial matchers in a one-to-many facial identification system. For instance, like the process 400D described with respect to FIG. 4D, the process 400D may include a plurality of facial matching modules that may be used in a coarse-to-fine fashion to identify candidate templates for a facial identification operation. For example, as shown, the multiple facial matchers may include facial matching modules 560a-560c. Although three facial matchers are illustrated in FIG. 5D, in some implementations, additional facial matchers may be used based on the expected localization errors and quality of the input facial identification image 502.

The facial matching modules 560a-560c represent individual facial matchers that may be used to perform the techniques represented in FIGS. 5A-5C. For instance, each of the facial matching modules 560a-560c may include the feature extraction module 510, the template comparison module 520, the decision logic module 530, the perturbation module 540, and/or the perturbation comparison module 550. In some implementations, the facial matchers 560a-560c may have different sensitivities such that the individual facial matchers may be configured to perform facial identification operations with different computational requirements (e.g., resource allocation) and with different levels of precision.

The process 400D may include the facial matching module 460a initially receiving the input facial identification image 502. The facial matching module 560a may then perform the multi-stage facial identification operation to determine if there is a hit found in within the gallery dataset extracted from the database 506 at the decision point 562a. As described in FIGS. 5B and 5C, the decision point 562a may correspond to the decision point 532 in FIG. 5B, depending on whether there is at least one gallery template within the top N templates 504c that is a mate identified for the input facial identification image 502. As shown, if at least one gallery template is identified as a mate within the top N templates 504c, then the facial matching module 562a may output a list 566a that identifies gallery identifiers associated with the mated gallery templates, the average similarity score between each mated gallery template and the top N templates 504c, and a rank based on the value of the average similarity score.

Alternatively, if no mate is found at the decision point 562a, then an average similarity score 564a for all of the top N gallery templates 504c (or in some instances, the top N' gallery templates 504e) may be computed and provided to a score combination module 580. In some instances, the average similarity score 564a may correspond to the average similarity score computed by the decision logic module 530 after performing a perturbation operation on the input facial identification image 502.

In addition to providing the average similarity score 564a to the score combination module 580, the process 500D may continue with the facial matching module 560b, which may subsequently perform a more precise, more resource-intensive facial identification operation of the input facial identification image 502. For example, in some implementations, the second facial matching module 560b may use a greater perturbation range or a smaller step size to generate a greater number of perturbed query templates to improve the likelihood of finding a mated gallery template. In other implementations, additional identification operations that were not performed by the first facial matching module 460a may be performed to determine if a mate exists in the decision point 562b. Similar to the decision point 562a, the second facial matching module 560b, and all other subsequent facial matchers such as the facial matching module 560c, may perform similar operations to determine if a mate is found within a facial identification operation.

As shown in FIG. 5D, the process 500D may terminate in two ways. For instance, if any of the multiple facial matching modules 560a-560c detects, during a respective identification stage, a mate for the input facial identification image 503, the respective facial matching module may output a list of the mated gallery templates, as shown by lists 566a-566c. Alternatively, if at each subsequent facial identification stage, each respective facial matching module is unable to find a mate for the input facial identification image 502, then the average similarity scores 564a-564c may be provided to the score combination module 580.

The score combination module 580 may combine (or "fuse") the values of the average similarity scores 564a-564c to generate, at the end of the process 500, a list 582 that includes gallery identifiers, the values of the average similarity scores 564a-564c, and a rank associated with each gallery template. The score combination module 580 may then provide the list 582 as output for the process 500D.

Figure 6:
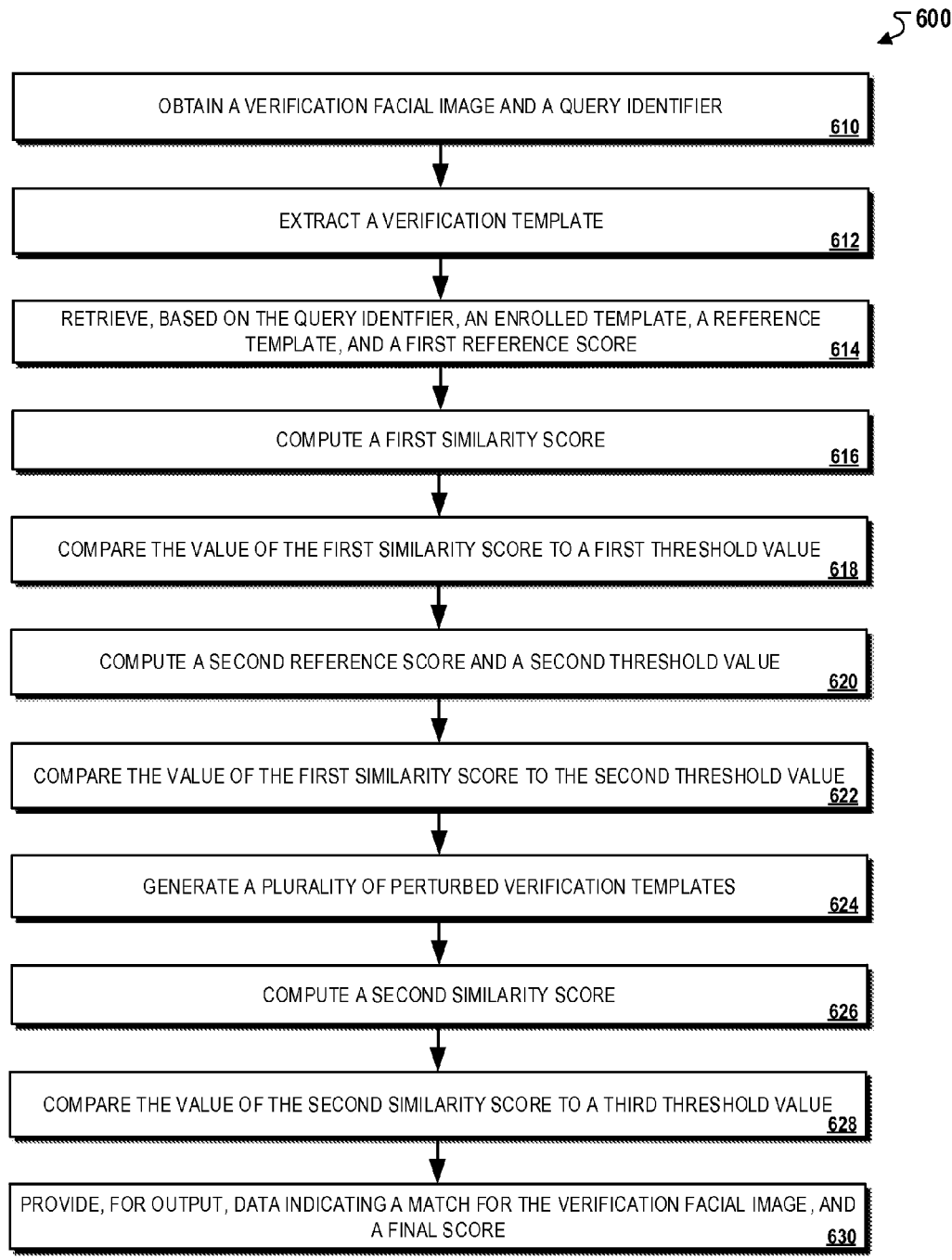
FIG. 6 is flow chart of an exemplary process of multi-stage facial matching.

FIG. 6 is a flow chart illustrating an exemplary process 600 of multi-stage facial matching. Briefly, the process 600 may include obtaining a verification facial image and a query identifier (610), extracting a verification template (612), retrieving, based on the query identifier, an enrolled template, a reference template, and a first reference score (614), computing a first similarity score (616), comparing the value of the first similarity score to a first threshold value (618), computing a second reference score and a second threshold value (620), comparing the value of the first similarity score to the second threshold value (622), generating a plurality of perturbed verification templates (624), computing a second similarity score (626), comparing the value of the second similarity score to a third threshold value (628), and providing, for output, data indicating a match for the verification facial image, and a final score (630).

In more detail, the process 600 may include obtaining a verification facial image and a query identifier (610). For instance, as described previously, the feature extraction module 410 may obtain the input facial verification image 402a including a plurality of registration points, and the query identifier 402b associated with the input facial verification image 402a.

The process 600 may include extracting a verification template (612). For instance, as described previously, the feature extraction module 410 may extract the verification template 406a based on the plurality of registration points within the input facial verification image 402a.

The process 600 may include retrieving, based on the query identifier, an enrolled template, a reference template, and a first reference score (614). For instance, the feature extraction module 410 may retrieve, based at least on the query identifier 402b and from a gallery dataset stored in the database 406, the enrolled target template 406b, the reference template 406c, and the reference score.

The process 600 may include computing a first similarity score (616). For instance, the template comparison module 420 may compute the first similarity score 408a between the verification template 406a and the enrolled target template 406b.

The process 600 may include comparing the value of the first similarity score to a first threshold value (618). For instance, the decision logic module 430 may compare the value of the first similarity score 408a to the threshold value, $T_{st}$.

The process 600 may include computing a second reference score and a second threshold value (620). For example, the decision logic module 430 may compute the delta score 408d and the threshold value $T_d$, where the value of the threshold value, $T_d$, is based at lease on the value of the reference score and the value of the delta score 408d.

The process 600 may include comparing the value of the first similarity score to the second threshold value (622). For instance, the decision logic module 430 may compare the delta score 408d to the threshold value, $T_d$.

The process 600 may include generating a plurality of perturbed verification templates (624). For instance, the perturbation module 440 may generate the perturbed verification templates 406d for the verification template 406a based at least on the plurality of registration points within the input facial verification image 402a.

The process 600 may include computing a second similarity score (626). For instance, the perturbation comparison module 450 may compute the similarity score 408f between the enrolled target template 406b and the perturbed verification templates 406d.

The process 600 may include comparing the value of the second similarity score to a third threshold value (628). For instance, the decision logic module 430 may compare the value of the similarity score 408f to the threshold value, $T_{st1}$.

The process 600 may include providing, for output, data indicating a match for the verification facial image, and a final score (630). For instance, the decision logic module 430 may provide, for output to the facial verification system, data indicating a match for the input facial verification image 402a, and a final score associated with the input facial verification image 402a. As shown in FIG. 4C, in some instances where the value of the similarity score 408f is greater than the value of the threshold, $T_{st1}$, the decision logic module 430 may output the similarity score 408f as the final score. Alternatively, in some instances where the value of the similarity score 408f is less than the value of the threshold, $T_{st1}$, the decision logic module 430 may output the delta score 408h as the final similarity score.

Described herein are computer systems such as facial matching computing devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some implementations, a computer program is provided, and the program is embodied on a computer readable medium. In an example implementation, the system is executed on a single computer system, without requiring a connection to a sever system. In a further implementation, the system is being run in a Windows® environment (Windows is a registered trademark of Microsoft Corporation, Redmond, Wash.). In yet another implementation, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some implementations, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example implementation" or "some implementations" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for recognizing facial images, the method implemented by a facial verification system having a processor and a memory coupled to the processor, the method comprising:
    obtaining (i) a verification facial image including a plurality of registration points, and (ii) a query identifier associated with the verification facial image;
    extracting a verification template based on the plurality of registration points;
    retrieving, based at least on the obtained query identifier and from a gallery dataset, (i) an enrolled target template, (ii) a reference template, and (iii) a first reference score between the target template and the reference template;
    computing a first similarity score between the verification template and the enrolled target template;
    comparing the value of the first similarity score to a first threshold value;
    computing, based at least on comparing the value of the first score to the first threshold value, (i) a second reference score between the verification template and the reference template, and (ii) a second threshold value, wherein the value of the second threshold value is based at least on the value of the first reference score and the value of the second reference score;
    comparing the value of the first similarity score and the second threshold value;
    generating, based at least on comparing the value of the first similarity score and the second threshold value, a plurality of perturbed verification templates for the verification template based at least on a plurality of perturbation points within the verification facial image;
    computing a second similarity score between the enrolled target template and the plurality of perturbed verification templates;
    comparing the value of the second similarity score to a third threshold value; and
    providing, for output to the facial verification system, based at least on comparing the value of the second similarity score to a threshold value, (i) data indicating a match for the verification facial image, and (ii) a final score associated with the verification facial image.

2. The method of claim 1, wherein generating the plurality of perturbed verification templates for the verification template comprises:
    obtaining a plurality of normalized verification facial images based at least on the plurality of registration points within the verification facial image; and
    extracting a plurality of perturbed verification templates from the normalized verification facial image.

3. The method of 2, wherein obtaining a plurality of normalized verification facial images comprises:
    identifying a plurality of perturbation points within the verification facial image based at least on the plurality of registration points within the verification facial image;
    performing a perturbation procedure to a particular perturbation point of the plurality of perturbation points within the verification facial image; and
    extracting a plurality verification templates based at least on performing the perturbation procedure.

4. The method of claim 3, wherein performing the perturbation procedure to the particular perturbation point of the plurality of perturbation points within the verification facial image comprises:
    determining a range of perturbation points associated with the perturbation procedure; and
    determining, during an offline design stage prior to performing the perturbation procedure, a step size for the applying the perturbation procedure to the positions of the plurality of perturbation points within the verification facial image.

5. The method of claim 3, performing the perturbation procedure to the particular registration point of the plurality of registration points within the verification facial image comprises:
    comparing a variation difference between the positions of a plurality of detected registration points and a set of ground truth registration locations for facial images with a different quality group; and
    computing (i) a standard deviation of localization errors, and (ii) a mean of localization errors, that are each associated with the positions of the plurality of detected registration points based at least on comparing a variation difference between the positions of the plurality of detected registration points and the set of ground truth registration locations for facial images with a different quality group.

6. The method of claim 5, wherein determining the range of perturbation associated with the perturbation procedure comprises:
    identifying a maximum perturbation range based at least on the standard deviation of the localization errors and the mean of localization errors.

7. The method of claim 1, comprising:
obtaining (i) an enrolled target image associated with an enrolled target identifier, and (ii) a plurality of pre-collected non-matching reference facial images;
generating an enrolled target template for the enrolled target image;
generating, for each of the plurality of pre-collected non-matching reference facial images, a reference template;
comparing the enrolled target template with each of the plurality of reference templates for the plurality of pre-collected non-matching reference facial images;
generating a non-matching score between the enrolled target template and each of the plurality of reference templates for the plurality of pre-collected non-matching reference facial images;
identifying a particular reference template that has the highest value of the non-matching scores as the first reference score; and
storing the particular reference template within a gallery template record.

8. A system comprising:
a facial verification device, including (i) an interface to a facial scanner, and (ii) a sensor associated with the facial scanner, configured to verify a facial image;
a database containing the plurality of reference facial images representing facial images of a plurality of historical subjects; and
a computing device in communication with the database and the fingerprint scanning device, the computing device having a processor and a memory coupled to the processor, the computing device configured perform operations comprising:
obtaining (i) a verification facial image including a plurality of registration points, and (ii) a query identifier associated with the verification facial image;
extracting a verification template based on the plurality of registration points;
retrieving, based at least on the obtained query identifier and from a gallery dataset, (i) an enrolled target template, (ii) a reference template, and (iii) a first reference score between the target template and the reference template;
computing a first similarity score between the verification template and the enrolled target template;
comparing the value of the first similarity score to a first threshold value;
computing, based at least on comparing the value of the first score to the first threshold value, (i) a second reference score between the verification template and the reference template, and (ii) a second threshold value, wherein the value of the second threshold value is based at least on the value of the first reference score and the value of the second reference score;
comparing the value of the first similarity score and the second threshold value;
generating, based at least on comparing the value of the first similarity score and the second threshold value, a plurality of perturbed verification templates for the verification template based at least on a plurality of perturbation points within the verification facial image;
computing a second similarity score between the enrolled target template and the plurality of perturbed verification templates;
comparing the value of the second similarity score to a third threshold value; and
providing, for output to the facial verification system, based at least on comparing the value of the second similarity score to a threshold value, (i) data indicating a match for the verification facial image, and (ii) a final score associated with the verification facial image.

9. The system of claim 8, wherein generating the plurality of perturbed verification templates for the verification template:
obtaining a plurality of normalized verification facial images based at least on the plurality of registration points within the verification facial image; and
extracting a plurality of perturbed verification templates from the normalized verification facial image.

10. The system of claim 9, wherein obtaining a plurality of normalized verification facial images comprises:
identifying a plurality of perturbation points within the verification facial image based at least on the plurality of registration points within the verification facial image;
performing a perturbation procedure to a particular perturbation point of the plurality of perturbation points within the verification facial image; and
extracting a plurality verification templates based at least on performing the perturbation procedure.

11. The system of claim 10, wherein performing the perturbation procedure to the particular perturbation point of the plurality of perturbation points within the verification facial image comprises:
determining a range of perturbation points associated with the perturbation procedure; and
determining, during an offline design stage prior to performing the perturbation procedure, a step size for the applying the perturbation procedure to the positions of the plurality of perturbation points within the verification facial image.

12. The system of claim 10, wherein performing the perturbation procedure to the particular registration point of the plurality of registration points within the verification facial image comprises:
comparing a variation difference between the positions of a plurality of detected registration points and a set of ground truth registration locations for facial images with a different quality group; and
computing (i) a standard deviation of localization errors, and (ii) a mean of localization errors, that are each associated with the positions of the plurality of detected registration points based at least on comparing a variation difference between the positions of the plurality of detected registration points and the set of ground truth registration locations for facial images with a different quality group.

13. The system of claim 12, wherein determining the range of perturbation associated with the perturbation procedure comprises:
identifying a maximum perturbation range based at least on the standard deviation of the localization errors and the mean of localization errors.

14. The system of claim 8, wherein the operations comprise:
obtaining (i) an enrolled target image associated with an enrolled target identifier, and (ii) a plurality of pre-collected non-matching reference facial images;
generating an enrolled target template for the enrolled target image;

generating, for each of the plurality of pre-collected non-matching reference facial images, a reference template;

comparing the enrolled target template with each of the plurality of reference templates for the plurality of pre-collected non-matching reference facial images;

generating a non-matching score between the enrolled target template and each of the plurality of reference templates for the plurality of pre-collected non-matching reference facial images;

identifying a particular reference template that has the highest value of the non-matching scores as the first reference score; and storing the particular reference template within a gallery template record.

15. A computer-implemented method for recognizing facial images, the method implemented by a facial identification system having a processor and a memory coupled to the processor, the method comprising:

obtaining, by a first facial matcher, (i) a query facial image including a plurality of registration points, (ii) a plurality of gallery templates from a gallery dataset, and (iii) a plurality of identifiers associated with the gallery templates;

extracting, by the first facial matcher, a query template based at least on the plurality of registration points;

comparing, by the first facial matcher, the query template to each of the plurality of gallery templates;

computing, by the first facial matcher, for each of the plurality of gallery templates, a first similarity score between the query template and each of the plurality of gallery templates;

selecting, by the first facial matcher, a subset of the plurality of gallery templates based at least on the respective values of the first similarity scores for each of the plurality of gallery templates;

generating, by the first facial matcher, a sorted list that (i) includes the subset of the plurality of gallery templates, and the respective values of the first similarity scores, (ii) is sorted based at least on the respective values of the first similarity scores, and (iii) includes a value difference between adjacent respective values of the first similarity scores within the sorted list;

comparing, by the first facial matcher, (i) the respective values of the first similarity scores to a first threshold value, and (ii) each of the value differences to a second threshold value;

in response to determining that (i) at least one of the respective values of the first similarity scores is greater than the first threshold value, and (ii) at least one of the value differences is less than the second threshold, performing operations comprising:

generating a plurality of perturbed query templates for the query template; and computing, for each gallery template within the subset of the plurality of gallery templates, a respective second similarity score between each of the subset of the plurality of gallery templates and each of the plurality of perturbed query templates;

comparing, by the first facial matcher, the respective values of the second similarity scores to a third threshold value;

in response to determining that each of the respective values of the second similarity scores are less than the third threshold value, providing, by the first matcher to a second facial matcher, a set of scores that includes the respective first similarity scores and the respective second similarity scores, for use in a subsequent fingerprint identification operation.

16. The method of claim 15, wherein the second facial matcher is configured to perform a higher precision facial identification operation, relative to the first facial matcher, using the set of first similarity and perturbed similarity scores.

17. The method of claim 15, wherein the first facial matcher has an operation speed that is faster than an operation speed of the second facial matcher.

18. The method of claim 17, wherein generating a plurality of perturbed query templates for the query template comprises:

obtaining a plurality of normalized query facial images based at least on the plurality of registration points within the query facial image; and extracting a plurality of perturbed query templates from the normalized query facial image.

19. The method of 18, wherein obtaining a plurality of normalized query facial images comprises:

identifying a plurality of perturbation points within the query facial image based at least on the plurality of registration points within the query facial image;

performing a perturbation procedure to a particular perturbation point of the plurality of perturbation points within the query facial image; and extracting a plurality query templates based at least on performing the perturbation procedure.

20. The method of claim 19, wherein performing the perturbation procedure to the particular perturbation point of the plurality of perturbation points within the query facial image comprises:

determining a range of perturbation points associated with the perturbation procedure; and determining, during an offline design stage prior to performing the perturbation procedure, a step size for the applying the perturbation procedure to the positions of the plurality of perturbation points within the query facial image.

* * * * *

UNITED STATES PATENT AND TRADEMARK OFFICE
CERTIFICATE OF CORRECTION

| | |
|---|---|
| PATENT NO. | : 9,747,494 B2 |
| APPLICATION NO. | : 14/942118 |
| DATED | : August 29, 2017 |
| INVENTOR(S) | : Peter Zhen-Ping Lo and Hui Chen |

It is certified that error appears in the above-identified patent and that said Letters Patent is hereby corrected as shown below:

Column 24, Line 23, Claim 3, delete "2," and insert -- claim 2, --.

Column 28, Line 33, Claim 19, delete "18," and insert -- claim 18, --.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*